(12) United States Patent
Xiu et al.

(10) Patent No.: US 12,707,091 B2
(45) **Date of Patent: *Aug. 11, 2026**

(54) METHODS AND APPARATUSES FOR SIGNALING OF SYNTAX ELEMENTS IN VIDEO CODING

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Tsung-Chuan Ma, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 97 days.

This patent is subject to a terminal disclaimer.

(21) Appl. No.: 18/776,227

(22) Filed: Jul. 17, 2024

(65) Prior Publication Data

US 2024/0373069 A1 Nov. 7, 2024

Related U.S. Application Data

(63) Continuation of application No. 17/990,654, filed on Nov. 18, 2022, now Pat. No. 12,088,850, which is a (Continued)

(51) Int. Cl.

| | |
|---|---|
| ***H04N 19/70*** | (2014.01) |
| ***H04N 19/169*** | (2014.01) |
| ***H04N 19/172*** | (2014.01) |

(52) U.S. Cl.

CPC .......... *H04N 19/70* (2014.11); *H04N 19/172* (2014.11); *H04N 19/188* (2014.11)

(58) Field of Classification Search

CPC ..... H04N 19/70; H04N 19/172; H04N 19/188

(Continued)

(56) References Cited

U.S. PATENT DOCUMENTS

| | | |
|---|---|---|
| 11,589,069 B2 | 2/2023 | Deshpande |
| 2016/0232233 A1 | 8/2016 | Hendry et al. |
| 2017/0111642 A1 | 4/2017 | Hendry et al. |

FOREIGN PATENT DOCUMENTS

| | | |
|---|---|---|
| CN | 106664424 A | 5/2017 |
| KR | 1020170117074 A | 10/2017 |
| WO | 2021236888 A1 | 11/2021 |

OTHER PUBLICATIONS

The State Intellectual Property Office of People's Republic of China, "First Office Opinion Notice" issued in Application No. 202310868493.X dated Jul. 12, 2024, with English translation, (16p).

(Continued)

*Primary Examiner* — Dominic D Saltarelli

(74) *Attorney, Agent, or Firm* — Arch & Lake LLP

(57) ABSTRACT

A method for video coding is provided. The method includes: setting, by an encoder, a first syntax element in a picture parameter set (PPS) specifying whether a picture corresponding to the PPS comprises more than one network abstraction layer (NAL) units and whether the more than one NAL units have a same NAL unit type; setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax (Continued)

receive a first syntax element in picture parameter sets (PPS) specifying whether a picture referring to the PPS comprises one or more network abstraction layer (NAL) units and whether the one or more NAL units have a same NAL unit type 702 receive a second syntax element in a picture header (PH) specifying whether the picture referring to the PH is an intra random access point (IRAP) picture or a gradual decoding refresh (GDR) picture 704 determine a value of the first syntax element based on a value of the second syntax element 706 element being 1; and forming, by the encoder, a bitstream with the first syntax element and the second syntax element.

12 Claims, 7 Drawing Sheets

Related U.S. Application Data continuation of application No. PCT/US2021/033502, filed on May 20, 2021.

(60) Provisional application No. 63/027,718, filed on May 20, 2020.

(58) Field of Classification Search
USPC .................................................... 375/240.26
See application file for complete search history.

(56) References Cited

OTHER PUBLICATIONS

The State Intellectual Property Office of People's Republic of China, "Second Examination Opinion Notice" issued in Application No. 202310868493.X dated Sep. 30, 2024, with English translation, (6p).
Japanese Intellectual Property Office, "Decision of Patent" issued to Japanese Application No. 2022-570739 dated Dec. 19, 2023, with English translation, (5p).
Korean Intellectual Property Office, "Notice of Final Rejection" issued to Application No. 10-2022-7044648 dated Dec. 18, 2023, with English translation, (8p).
Korean Patent Office, "patent decision" issued to Application No. 10-2022-7044648 dated Apr. 19, 2024, with English translation, (6p).
INOA of Application No. IN202247073837 dated on Jan. 30, 2023 with English translation, (9p).
Editors, Benjamin Bross, et al., "Versatile Video Coding (Draft 9)," Joint Video Experts Team (JVET) of ITU-SG 16 WP 3 and ISO/IEC JTC 1/SC 29/WG 11, JVET-R2001-vA, 18th Meeting: by teleconference, Apr. 15-24, 2020, (525p).
Search Report Issued in KR10-2022-7044648 Application dated Dec. 20, 2022 with English translation, (20p).
Benjamin Bross, et al., "Versatile Video Coding (Draft 9)," Joint Video Experts Team (JVET) of ITU-SG 16 WP 3 and ISO/IEC JTC 1/SC 29/WG 11, JVET-R2001-vA9, 18th Meeting: by teleconference, Apr. 15-24, 2020, (4p).
Sharp Labs of America, Inc. Jonatan Samuelsson: "AHG9: On picture header," Joint Video Experts Team (JVET) of ITU-SG 16 WP 3 and ISO/IEC JTC 1/SC 29/WG 11, JVET-R0112, 18th Meeting: by teleconference, Apr. 15-24, 2020, (2p).
Qualcomm Incoporated, Vadim Seregin et al., "AHG8: On SPS sharing and slice type constraint," Joint Video Experts Team (JVET) of ITU-SG 16 WP 3 and ISO/IEC JTC 1/SC 29/WG 11, JVET-R0278, 18th Meeting: by teleconference, Apr. 15-24, 2020, (5p).
Huawei Techonologies Co., Ltd, Biao Wang et al., "Signaling cleanup on PPS," Joint Video Experts Team (JVET) of ITU-SG 16 WP 3 and ISO/IEC JTC 1/SC 29/WG 11, JVET-R0157-v1, 18th Meeting: by teleconference, Apr. 15-24, 2020, (4p).
JOPA2-Decision of Refusal of Japanese Patent Application No. 2022-570739 dated Jun. 27, 2023 with English translation, (13p).
JPOA1-Decision of Refusal of Japanese Patent Application No. 2022-570739 dated Apr. 11, 2023 with English translation, (31p).
Benjamin Bross, et al., "Versatile Video Coding (Draft 9)," Joint Video Experts Team (JVET) of ITU-SG 16 WP 3 and ISO/IEC JTC 1/SC 29/WG 11, JVET-R2002-vA9, 18th Meeting: by teleconference, Apr. 15-24, 2020, (30p).
Coban, Muhammed et al., "AHG9: On mixed nal unit type signaling and PPS cleanup," Joint Video Experts Team (JVET) of ITU-SG 16 WP 3 and ISO/IEC JTC 1/SC 29/WG 11, JVET-R0315, 18th Meeting: by teleconference, Apr. 15-24, 2020, (10p).
Xiu, Xiaoyu et al.," AHG9: On IRAP and GDR picture signaling in picture header," oint Video Experts Team (JVET) of ITU-SG 16 WP 3 and ISO/IEC JTC 1/SC 29/WG 11, JVET-S0135, 19th Meeting: by teleconference, Jun. 22-Jul. 1, 2020, (5p).
Chen, Lulin et al., "AHG9: On signaling the mixed NAL unit type flag," oint Video Experts Team (JVET) of ITU-SG 16 WP 3 and ISO/IEC JTC 1/SC 29/WG 11, JVET-R0085-v1, 18th Meeting: by teleconference, Apr. 15-24, 2020, (8p).
International Search Report in Application No. PCT/US2021/033502 dated Sep. 10, 2021 (3p).
Benjamin Bross, et al., "Versatile Video Coding (Draft 9)," Joint Video Experts Team (JVET) of ITU-SG 16 WP 3 and ISO/IEC JTC 1/SC 29/WG 11, JVET-R2002-vA, 18th Meeting: by teleconference, Apr. 15-24, 2020, (526p).
Jonatan Samuelsson: "AHG9: On picture header, " Joint Video Experts Team (JVET) of ITU-SG 16 WP 3 and ISO/IEC JTC 1/SC 29/WG 11, JVET-R0112, 18th Meeting: by teleconference, Apr. 15-24, 2020, (3p).
Vadim Seregin et al., "AHG8: On SPS sharing and slice type constraint," Joint Video Experts Team (JVET) of ITU-SG 16 WP 3 and ISO/IEC JTC 1/SC 29/WG 11, JVET-R0278, 18th Meeting: by teleconference, Apr. 15-24, 2020, (6p).
Biao Wang et al., "Signaling cleanup on PPS," Joint Video Experts Team (JVET) of ITU-SG 16 WP 3 and ISO/IEC JTC 1/SC 29/WG 11, JVET-R0157-v1, 18th Meeting: by teleconference, Apr. 15-24, 2020, (5p).
Office Action issued in EP Application No. 21809825.9 dated Sep. 10, 2023, (7p).
Benjamin Bross, et al., "Versatile Video Coding (Draft 9)," 130, MPEG Meeting; Apr. 20, 2020-Apr. 24, 2020; Alpbach; (Motion Picture Expert Group or ISO/IEC JTC 1/SC 29/WG 11), No. m53983; JVET-R2001 May 12, 2020 (May 12, 2020), XP030287935, (526p).
Office Action Issued in KR10-2022-7044648 dated Aug. 25, 2023, (15p).
Benjamin Bross, et al., "Versatile Video Coding (Draft 9)," Joint Video Experts Team (JVET) of ITU-SG 16 WP 3 and ISO/IEC JTC 1/SC 29/WG 11, JVET-R2001-vA, 18th Meeting: by teleconference, Apr. 15-24, 2020, (525p).
Ye-Kui Wang et al., Joint Video Experts Team (JVET) of ITU-SG 16 WP 3 and ISO/IEC JTC 1/SC 29/WG 11, JVET-R0414-v1, 18th Meeting: by teleconference, Apr. 15-24, 2020, (9p).
JPOA issued in Application No. 2023-184964, dated on Jun. 3, 2025, with English translation, (6p).
Benjamin Bross, et al., "Versatlie Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, JVET-R2001-VA, (65p).
Qualcomm Inc., Muhammed Coban, et al., "AHG9: On mixed nal unit type signalling and PPS cleanup", Joint Video Experts Team (JVET) of ITU-T SG 16 WP 3 and ISO/IEC JTC 1/SC 29/WG 11, 18th Meeting: by teleconference, Apr. 15-24, 2020,JVET-R0315, (9p).
MeidaTek Inc., Lulin Chen, et al., "AHG9: On signalling the mixed NAL unit type flag", Joint Video Experts Team (JVET) of ITU-T SG 16 WP 3 and ISO/IEC JTC 1/SC 29/WG 11, 18th Meeting: by teleconference, Apr. 15-24, 2020, JVET-R0085-v1, (7p).
Kwai Inc., Xiaoyu Xiu, et al., "AHG9: On IRAP and GDR picture signalling in picture header", Joint Video Experts Team (JVET) of ITU-T SG 16 WP 3 and ISO/IEC JTC 1/SC 29/WG 11, 19th Meeting: by teleconference, Jun. 22-Jul. 1, 2020,JVET-S0135, (4p).
JPOA issued in Application No. 2024-031365 dated on Nov. 19, 2024 with English translation, (6p).
Benjamin Bross et al., "Versatile Video Coding (Draft 9)", Joint Video Experts Team (JVET) of ITU-T SG 16 WP 3 and ISO/IEC JTC 1/SC 29/WG 11, JVET-R2001-vA, 18th Meeting: by teleconference, Apr. 15-24, 2020, (30p).
Muhammed Coban et al., "AHG9: On mixed nal unit type signalling and PPS cleanup", Joint Video Experts Team (JVET) of ITU-T SG 16 WP 3 and ISO/IEC JTC 1/SC 29/WG 11, JVET-R0315, 18th Meeting: by teleconference, Apr. 15-24, 2020, (10p).
Lulin Chen et al., "AHG9: On signalling the mixed NAL unit type flag", Joint Video Experts Team (JVET) of ITU-T SG 16 WP 3 and

(56) References Cited

OTHER PUBLICATIONS

1SO/IEC JTC 1/SC 29/WG 11, JVET-R0085-v1, 18th Meeting: by teleconference, Apr. 15-24, 2020, (8p).

Xiaoyu Xiu et al., "AHG9: On IRAP and GDR picture signaling in picture header", Joint Video Experts Team (JVET) of ITU-T SG 16 WP 3 and ISO/IEC JTC 1/SC 29/WG 11, JVET-S0135, 19th Meeting: by teleconference, Jun. 22-Jul. 1, 2020, (5p).

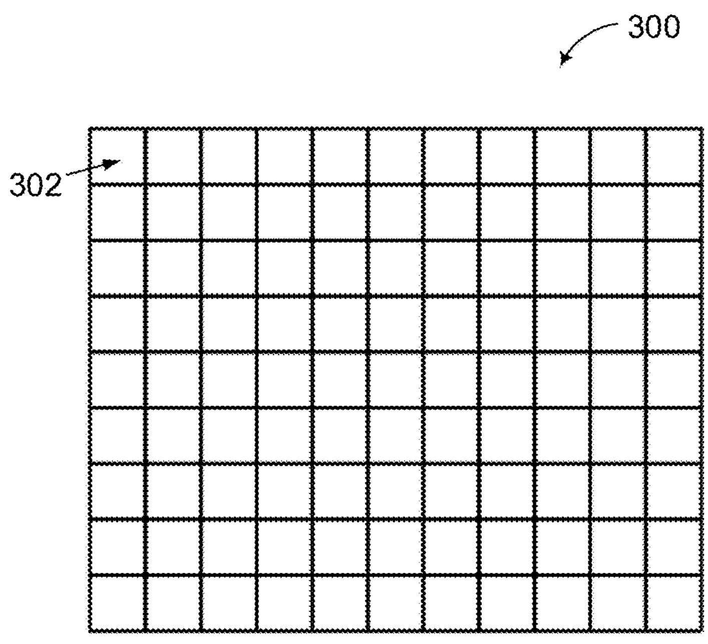
FIG. 3
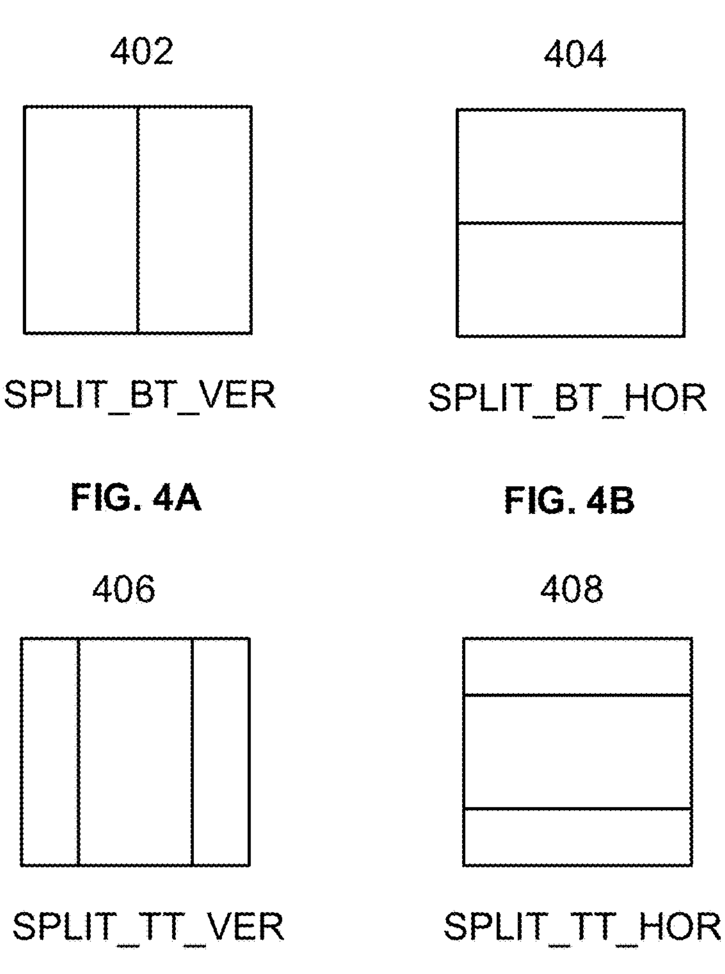
FIG. 4A
FIG. 4B
FIG. 4C
FIG. 4D receive a first syntax element in picture parameter sets (PPS) specifying whether a picture referring to the PPS comprises one or more network abstraction layer (NAL) units and whether the one or more NAL units have a same NAL unit type 702

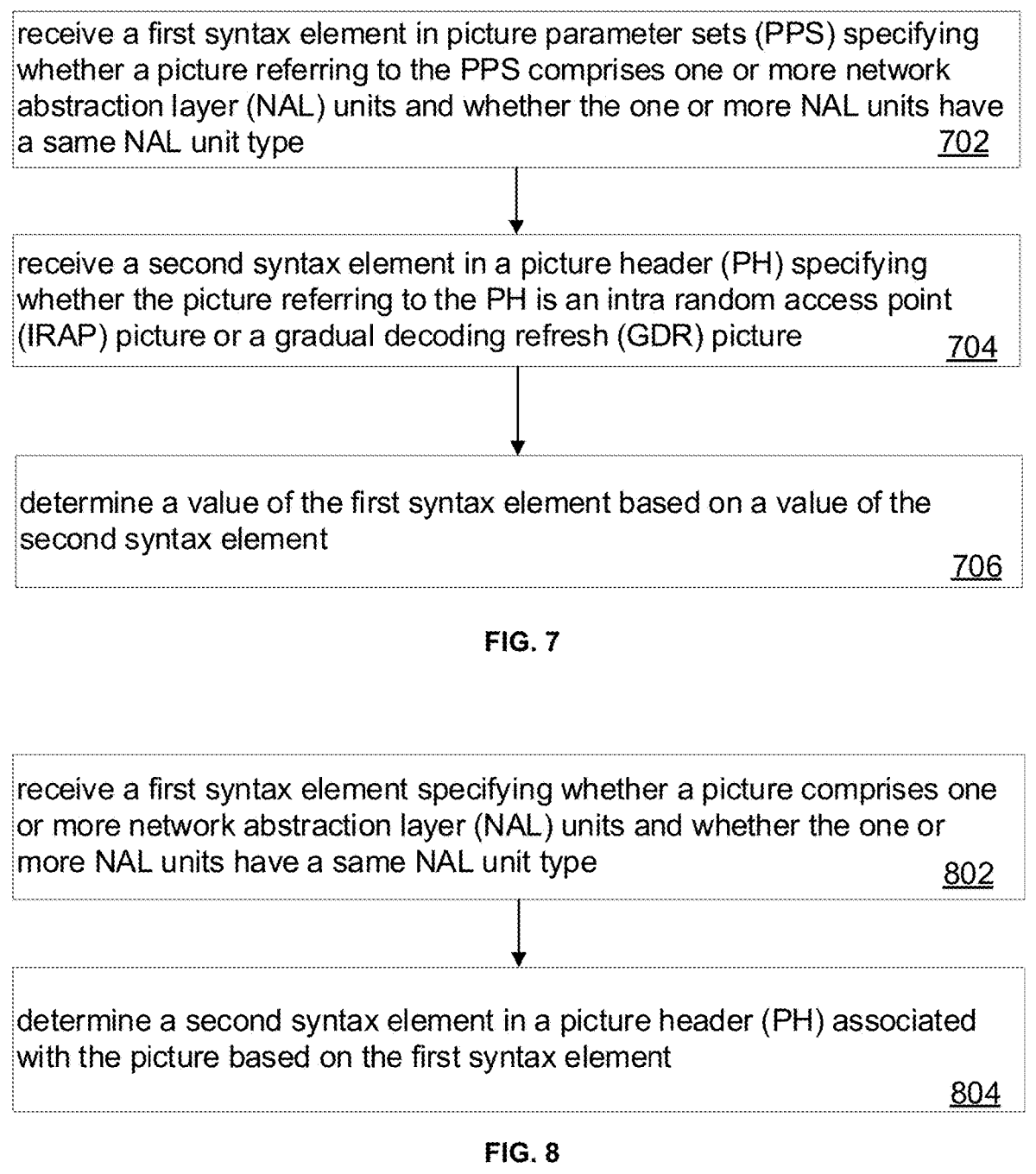

↓ receive a second syntax element in a picture header (PH) specifying whether the picture referring to the PH is an intra random access point (IRAP) picture or a gradual decoding refresh (GDR) picture 704

↓ determine a value of the first syntax element based on a value of the second syntax element 706

FIG. 7 receive a first syntax element specifying whether a picture comprises one or more network abstraction layer (NAL) units and whether the one or more NAL units have a same NAL unit type 802

↓ determine a second syntax element in a picture header (PH) associated with the picture based on the first syntax element 804

FIG. 8

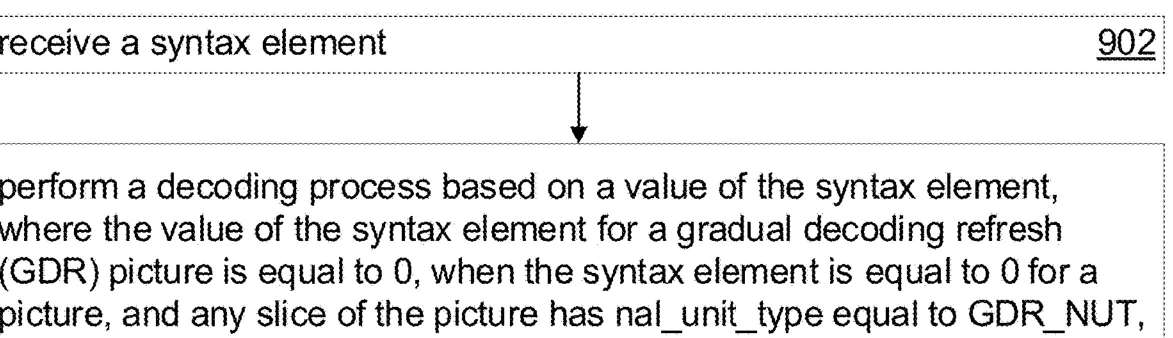

FIG. 9 receive a first syntax element in picture parameter sets (PPS) specifying whether a picture referring to the PPS comprises one or more network abstraction layer (NAL) units and whether the one or more NAL units have a same NAL unit type 1002 receive a second syntax element in a picture header (PH) specifying whether the picture referring to the PH is an intra random access point (IRAP) picture or a gradual decoding refresh (GDR) picture 1004 determine a value of the second syntax element based on a value of the first syntax element 1006

FIG. 10

METHODS AND APPARATUSES FOR SIGNALING OF SYNTAX ELEMENTS IN VIDEO CODING

CROSS-REFERENCE TO RELATED APPLICATIONS

This application is a continuation application of U.S. patent application Ser. No. 17/990,654, filed on Nov. 18, 2022, which is a continuation of International Application No.: PCT/US2021/033502, filed on May 20, 2021, which is based upon and claims priority to U.S. Provisional Application No. 63/027,718, entitled "Signaling of Syntax Elements in Video Coding," filed on May 20, 2020, the entire disclosures of which are incorporated by reference for all purposes.

FIELD

The present disclosure relates to video coding and compression, and in particular but not limited to, methods and apparatuses for signaling of syntax elements in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

The present disclosure provides examples of techniques relating to signaling of syntax elements in video coding.

According to a first aspect of the present disclosure, a method of video coding is provided. The method includes: setting, by an encoder, a first syntax element in a picture parameter set (PPS) specifying whether a picture corresponding to the PPS comprises more than one network abstraction layer (NAL) units and whether the more than one NAL units have a same NAL unit type; setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax element being 1; and forming, by the encoder, a bitstream with the first syntax element and the second syntax element.

According to a second aspect of the present disclosure, a apparatus for video coding is provided. The apparatus for video coding includes one or more processors; and a memory configured to store instructions executable by the one or more processors; wherein the one or more processors, upon execution of the instructions, are configured to perform a method including following steps: setting, by an encoder, a first syntax element in a picture parameter set (PPS) specifying whether a picture corresponding to the PPS comprises more than one network abstraction layer (NAL) units and whether the more than one NAL units have a same NAL unit type; setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax element being 1; and forming, by the encoder, a bitstream with the first syntax element and the second syntax element According to a third aspect of the present disclosure, a non-transitory computer-readable storage medium having stored therein instructions is provided. The non-transitory computer readable storage medium stores a bitstream generated by a method including: setting, by an encoder, a first syntax element in a picture parameter set (PPS) specifying whether a picture corresponding to the PPS comprises more than one network abstraction layer (NAL) units and whether the more than one NAL units have a same NAL unit type; setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax element being 1; and forming, by the encoder, a bitstream with the first syntax element and the second syntax element.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 3 illustrates an example of a picture divided into multiple coding tree units (CTUs) in accordance with some implementations of the present disclosure.

FIGS. 4A-4D are schematic diagrams illustrating multi-type tree splitting modes in accordance with some implementations of the present disclosure.

FIG. 7 is a flowchart illustrating an exemplary process of video coding in accordance with some implementations of the present disclosure.

FIG. 8 is a flowchart illustrating an exemplary process of video coding in accordance with some implementations of the present disclosure.

FIG. 9 is a flowchart illustrating an exemplary process of video coding in accordance with some implementations of the present disclosure.

FIG. 10 is a flowchart illustrating an exemplary process of video coding in accordance with some implementations of the present disclosure.

DETAILED DESCRIPTION

Figure 1:
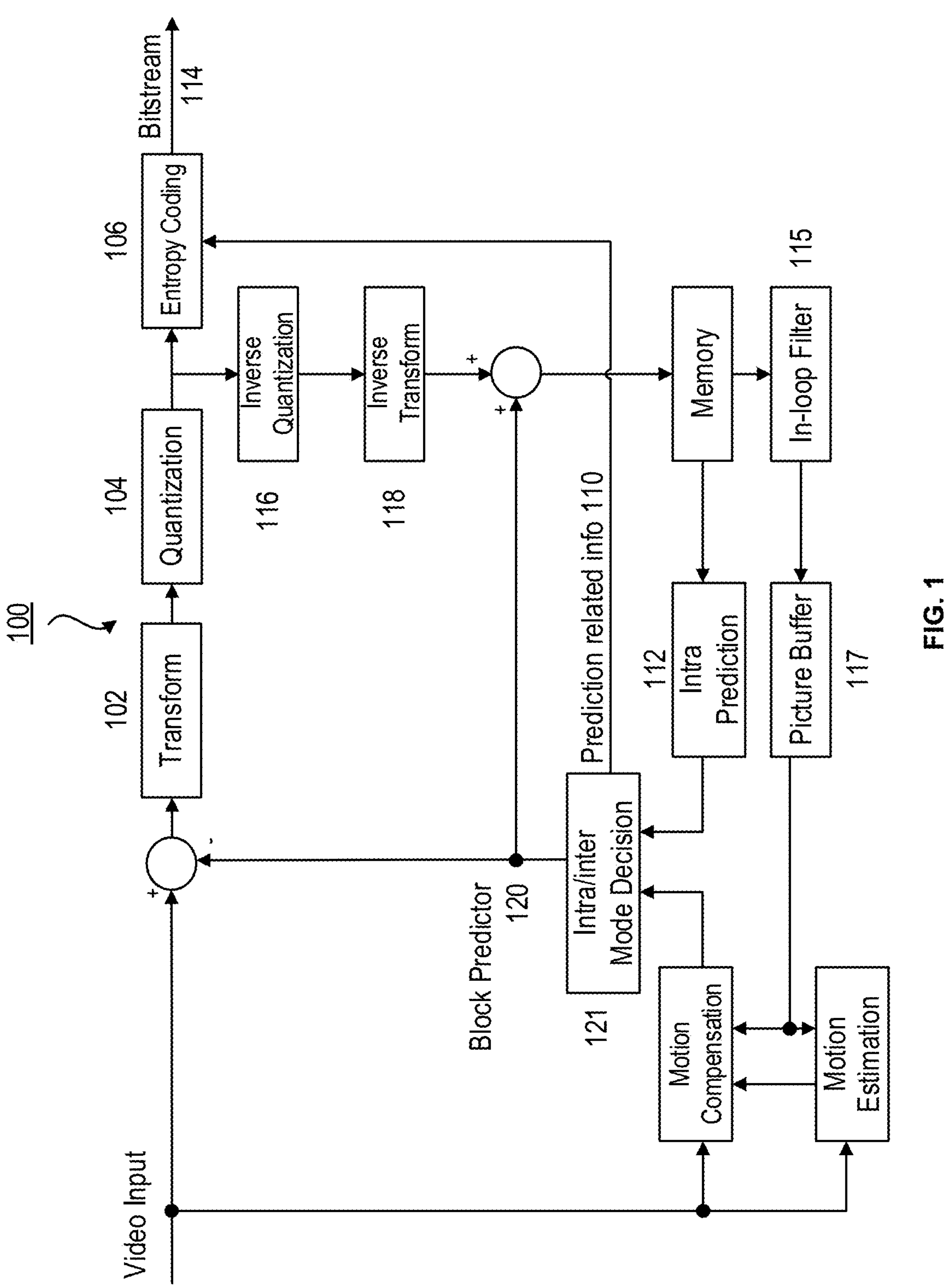
FIG. 1 is a block diagram illustrating an exemplary video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Intra prediction (also referred to as "spatial prediction") uses pixels from the samples of already coded neighboring blocks (which are called reference samples) in the same video picture and/or slice to predict the current video block. Spatial prediction reduces spatial redundancy inherent in the video signal.

Inter prediction (also referred to as "temporal prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filter 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
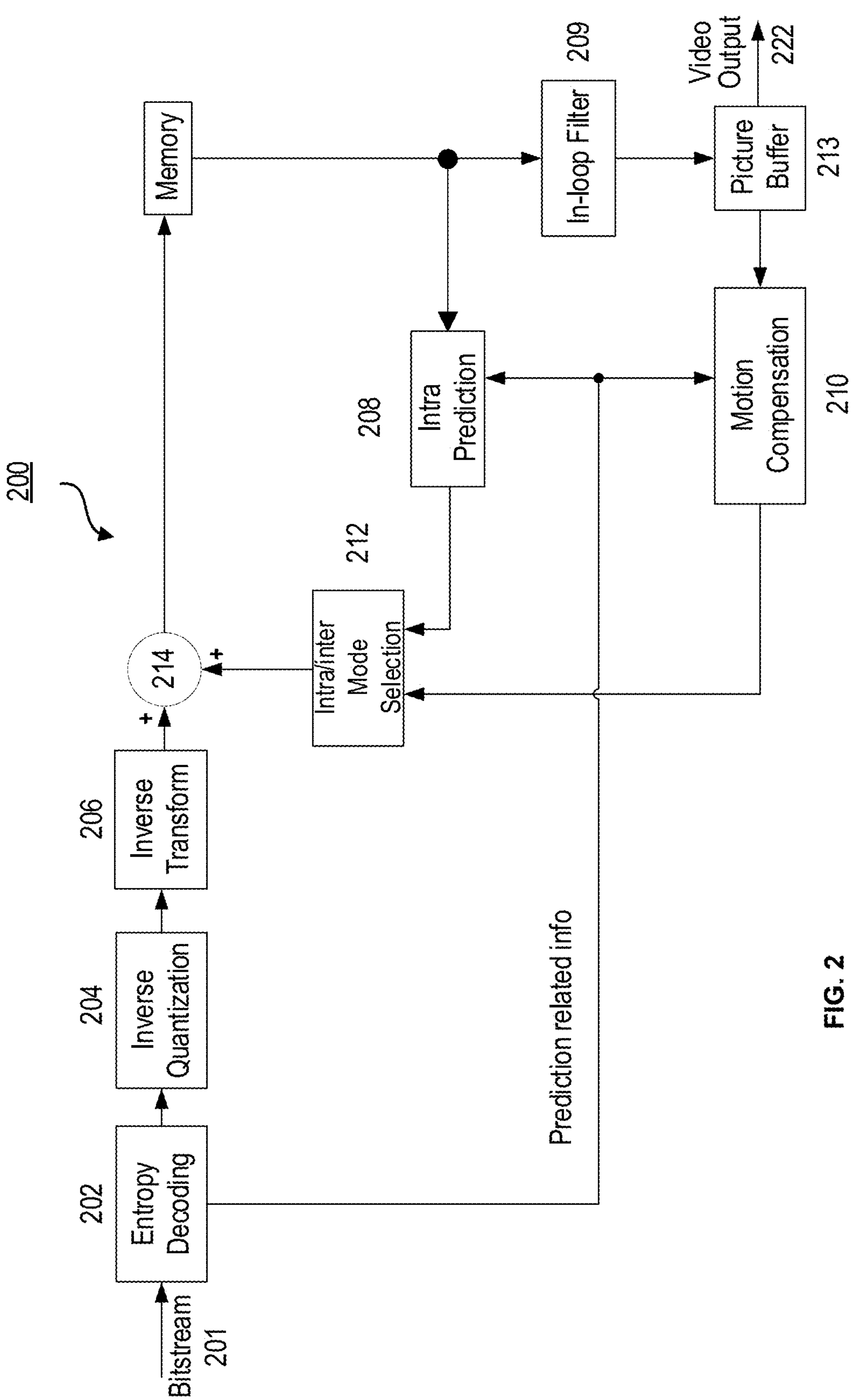
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Versatile Video Coding (VVC)

At the 10th JVET meeting, held Apr. 10-20, 2018, San Diego, US, JVET defined the first draft of VVC and the VVC Test Model 1 (VTM1) as its reference software implementation. It was decided to include a quadtree with a nested multi-type tree as the initial new coding feature of VVC. The multi-type tree is a coding block partition structure including both binary and ternary split. Since then, the reference software VTM, with both encoding and decoding process implemented, has been developed and updated through the following JVET meetings.

In VVC, a picture of an input video is partitioned into blocks called CTUs. A CTU is split into CUs using a quadtree with a nested multi-type tree structure, with a CU defining a region of pixels sharing the same prediction mode (e.g., intra or inter). The term 'unit' may define a region of an image covering all components such as luma and chroma. The term 'block' may be used to define a region covering a particular component (e.g., luma), and the blocks of different components (e.g., luma vs. chroma) may differ in spatial location when considering the chroma sampling format such as 4:2:0.

Partitioning of the Picture into CTUs

FIG. 3 illustrates an example of a picture 300 divided into multiple CTUs 302 in accordance with some implementations of the present disclosure.

In VVC, pictures are divided into a sequence of CTUs. The CTU concept is same to that of the HEVC. For a picture that has three sample arrays, a CTU consists of an N×N block of luma samples together with two corresponding blocks of chroma samples.

The maximum allowed size of the luma block in a CTU is specified to be 128×128 (although the maximum size of the luma transform blocks is 64×64).

Partitioning of the CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e., it removes the separation of the CU, PU and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (a.k.a. quadtree) structure. Then the quaternary tree leaf nodes can be further partitioned by a multi-type tree structure.

FIGS. 4A-4D are schematic diagrams illustrating multi-type tree splitting modes in accordance with some implementations of the present disclosure. As shown in FIGS. 4A-4D, there are four splitting types in multi-type tree structure, vertical binary splitting 402 (SPLIT_BT_VER), horizontal binary splitting 404 (SPLIT_BT_HOR), vertical ternary splitting 406 (SPLIT_TT_VER), and horizontal ternary splitting 408 (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quadtree with nested multi-type tree coding block structure. The exception occurs when maximum supported transform length is smaller than the width or height of the colour component of the CU.

Syntax in VVC

In VVC, the first layer of bitstream of syntax signaling is the NAL where the bitstream is divided into a set of NAL units. Some NAL units signal common control parameters to the decoder, such as the SPS and PPS. Others contain video data. The Video Coding Layer (VCL) NAL units contain slices of coded video. A coded picture is called an access unit and can be encoded as one or more slices.

A coded video sequence starts with an Instantaneous Decoder Refresh (IDR) picture. All following video pictures are coded as slices. A new IDR picture signals that the previous video segment is ended, and a new one begins.

Each NAL unit begins with a one-byte header followed by the Raw Byte Sequence Payload (RBSP). The RBSP contains encoded slices.

Slices are binary coded, so they may be padded with zero bits to ensure that the length is an integer number of bytes. A slice consists of a slice header and slice data. Slice data are specified as a series of CUs.

The picture header concept was adopted in the 16th JVET meeting to be transmitted once per picture as the first VCL NAL unit of a picture. It was also proposed to group some syntax elements previously in the slice header to this picture header. Syntax elements that functionally only need to be transmitted once per picture could be moved to the picture header instead of being transmitted multiple times in slices for a given picture.

In the VVC specification, the syntax tables specify a superset of the syntax of all allowed bitstreams. Additional constraints on the syntax may be specified, either directly or indirectly, in other clauses. Table 1 and Table 2 below are syntax tables of the slice header and PH in VVC. The semantics of some syntax are also illustrated after the syntax tables.

TABLE 1

| | Descriptor |
|---|---|
| slice_header( ) { | |
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| if( ( rect_slice_flag && NumSlicesInSubpic[ CurrSubpicIdx ] > 1 ) \| \| ( !rect_slice_flag && NumTilesInPic > 1 ) ) | |
| slice_address | u(v) |
| for( i = 0; i < NumExtraShBits; i++ ) | |
| sh_extra_bit[ i ] | u(1) |
| if( !rect_slice_flag && NumTilesInPic > 1 ) | |
| num_tiles_in_slice_minus1 | ue(v) |
| if( ph_inter_slice_allowed_flag ) | |
| slice_type | ue(v) |
| if( sps_alf_enabled_flag && !alf_info_in_ph_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| if( sps_ccalf_enabled_flag ) { | |
| slice_cc_alf_cb_enabled_flag | u(1) |
| if( slice_cc_alf_cb_enabled_flag ) | |
| slice_cc_alf_cb_aps_id | u(3) |
| slice_cc_alf_cr_enabled_flag | u(1) |
| if( slice_cc_alf_cr_enabled_flag ) | |
| slice_cc_alf_cr_aps_id | u(3) |
| } | |
| } | |
| } | |
| if( separate_colour_plane_flag = = 1 ) | |
| colour_plane_id | u(2) |
| if( !rpl_info_in_ph_flag && ( ( nal_unit_type != IDR_W_RADL && nal_unit_type != IDR_N_LP ) \| \| sps_idr_rpl_present_flag ) ) | |
| ref_pic_lists( ) | |
| if( ( rpl_info_in_ph_flag \| \| ( ( nal_unit_type != IDR_W_RADL && nal_unit_type != IDR_N_LP ) \| \| sps_idr_rpl_present_flag ) ) && ( ( slice_type != I && num_ref_entries[ 0 ][ RplsIdx[ 0 ] ] > 1 ) \| \| ( slice_type = = B && num_ref_entries[ 1 ][ RplsIdx[ 1 ] ] > 1 ) ) ) | |

TABLE 1-continued

| | Descriptor |
|---|---|
| { | |
| num_ref_idx_active_override_flag | u(1) |
| if( num_ref_idx_active_override_flag ) | |
| for( i = 0; i < ( slice_type = = B ? 2: 1 ); i++ ) | |
| if( num_ref_entries[ i ][ RplsIdx[ i ] ] > 1 ) | |
| num_ref_idx_active_minus1[ i ] | ue(v) |
| } | |
| if( slice_type != I ) { | |
| if( cabac_init_present_flag ) | |
| cabac_init_flag | u(1) |
| if( ph_temporal_mvp_enabled_flag && !rpl_info_in_ph_flag ) { | |
| if( slice_type = = B ) | |
| slice_collocated_from_l0_flag | u(1) |
| if( ( slice_collocated_from_l0_flag && NumRefIdxActive[ 0 ] > 1 ) \| \| ( ! slice_collocated_from_l0_flag && NumRefIdxActive[1 ] > 1 ) ) | |
| slice_collocated_ref_idx | ue(v) |
| } | |
| if( !wp_info_in_ph_flag && ( ( pps_weighted_pred_flag && slice_type = = P ) \| \| ( pps_weighted_bipred_flag && slice_type = = B ) ) ) | |
| pred_weight_table( ) | |
| } | |
| if( !qp_delta_info_in_ph_flag ) | |
| slice_qp_delta | se(v) |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( pps_cu_chroma_qp_offset_list_enabled_flag ) | |
| cu_chroma_qp_offset_enabled_flag | u(1) |
| if( sps_sao_enabled_flag && !sao_info_in_ph_flag ) { | |
| slice_sao_luma_flag | u(1) |
| if( ChromaArrayType != 0 ) | |
| slice_sao_chroma_flag | u(1) |
| } | |
| if( deblocking_filter_override_enabled_flag && !dbf_info_in_ph_flag ) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| slice_ts_residual_coding_disabled_flag | u(1) |
| if( ph_lmcs_enabled_flag ) | |
| slice_lmcs_enabled_flag | u(1) |
| if( ph_explicit_scaling_list_enabled_flag ) | |
| slice_explicit_scaling_list_used_flag | u(1) |
| if( NumEntryPoints > 0 ) { | |
| offset_len_minus1 | ue(v) |
| for( i = 0; i < NumEntryPoints; i++ ) | |
| entry_point_offset_minus1[ i ] | u(v) |
| } | |
| if( slice_header_extension_present_flag ) { | |
| slice_header_extension_length | ue(v) |
| for( i = 0; i < slice_header_extension_length; i++) | |
| slice_header_extension_data_byte[ i ] | u(8) |
| } | |
| byte_alignment( ) | |
| } | |

TABLE 2

| | Descriptor |
|---|---|
| picture_header_structure( ) { | |
| gdr_or_irap_pic_flag | u(1) |
| if( gdr_or_irap_pic_flag ) | |
| gdr_pic_flag | u(1) |
| ph_inter_slice_allowed_flag | u(1) |
| if( ph_inter_slice_allowed_flag ) | |
| ph_intra_slice_allowed_flag | u(1) |
| non_reference_picture_flag | u(1) |
| ph_pic_parameter_set_id | ue(v) |
| ph_pic_order_cnt_lsb | u(v) |
| if( gdr_or_irap_pic_flag ) | |
| no_output_of_prior_pics_flag | u(1) |
| if( gdr_pic_flag ) | |
| recovery_poc_cnt | ue(v) |
| for( i = 0; i < NumExtraPhBits; i++ ) | |
| ph_extra_bit[ i ] | u(1) |
| if( sps_poc_msb_flag ) { | |
| ph_poc_msb_present_flag | u(1) |
| if( ph_poc_msb_present_flag ) | |
| poc_msb_val | u(v) |
| } | |
| if( sps_alf_enabled_flag && alf_info_in_ph_flag ) { | |
| ph_alf_enabled_flag | u(1) |
| if( ph_alf_enabled_flag ) { | |
| ph_num_alf_aps_ids_luma | u(3) |
| for( i = 0; i < ph_num_alf_aps_ids_luma; i++ ) | |
| ph_alf_aps_id_luma[ i ] | u(3) |
| if( ChromaArrayType != 0 ) | |
| ph_alf_chroma_idc | u(2) |
| if( ph_alf_chroma_idc > 0 ) | |
| ph_alf_aps_id_chroma | u(3) |
| if( sps_ccalf_enabled_flag ) { | |
| ph_cc_alf_cb_enabled_flag | u(1) |
| if( ph_cc_alf_cb_enabled_flag ) | |
| ph_cc_alf_cb_aps_id | u(3) |
| ph_cc_alf_cr_enabled_flag | u(1) |
| if( ph_cc_alf_cr_enabled_flag ) | |
| ph_cc_alf_cr_aps_id | u(3) |
| } | |
| } | |
| } | |
| if( sps_lmcs_enabled_flag ) { | |
| ph_lmcs_enabled_flag | u(1) |
| if( ph_lmcs_enabled_flag ) { | |
| ph_lmcs_aps_id | u(2) |
| if( ChromaArrayType != 0 ) | |
| ph_chroma_residual_scale_flag | u(1) |
| } | |
| } | |
| if( sps_explicit_scaling_list_enabled_flag ) { | |
| ph_explicit_scaling_list_enabled_flag | u(1) |
| if( ph_explicit_scaling_list_enabled_flag ) | |
| ph_scaling_list_aps_id | u(3) |
| } | |
| if( sps_virtual_boundaries_ enabled_flag && !sps_virtual_boundaries_present_flag ) { | |
| ph_virtual_boundaries_present_flag | u(1) |
| if( ph_virtual_boundaries_present_flag ) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++ ) | |
| ph_virtual_boundaries_pos_y[ i ] | u(13) |
| } | |
| } | |
| if( output_flag_present_flag ) | |
| pic_output_flag | u(1) |
| if( rpl_info_in_ph_flag ) | |
| ref_pic_lists( ) | |
| if( partition_constraints_override_enabled_flag ) | |
| partition_constraints_override_flag | u(1) |
| if( ph_intra_slice_allowed_flag ) { | |
| if( partition_constraints_override_flag ) { | |
| ph_log2_diff _min_qt_min_cb_ intra_slice_luma | ue(v) |
| ph_max_mtt_hierarchy_depth_intra_slice_luma | ue(v) |
| if( ph_max_mtt_hierarchy_depth_intra_slice_luma != 0 ) { | |
| ph_log2_diff_max_bt_min_qt_ intra_slice_luma | ue(v) |

TABLE 2-continued

| | Descriptor |
|---|---|
| ph_log2_diff_max_tt_min_qt_intra_slice_luma | ue(v) |
| } | |
| if( qtbtt_dual_tree_intra_flag ) { | |
| ph_log2_diff_min_qt_min_cb_intra_slice_chroma | ue(v) |
| ph_max_mtt_hierarchy_depth_intra_slice_chroma | ue(v) |
| if( ph_max_mtt_hierarchy_depth_intra_slice_chroma != 0 ) { | |
| ph_log2_diff_max_bt_min_qt_intra_slice_chroma | ue(v) |
| ph_log2_diff_max_tt_min_qt_intra_slice_chroma | ue(v) |
| } | |
| } | |
| } | |
| if( cu_qp_delta_enabled_flag ) | |
| ph_cu_qp_delta_subdiv_intra_slice | ue(v) |
| if( pps_cu_chroma_qp_offset_list_enabled_flag ) | |
| ph_cu_chroma_qp_offset_subdiv_intra_slice | ue(v) |
| } | |
| if( ph_inter_slice_allowed_flag ) { | |
| if( partition_constraints_override_flag ) { | |
| ph_log2_diff_min_qt_min_cb_inter_slice | ue(v) |
| ph_max_mtt_hierarchy_depth_inter_slice | ue(v) |
| if( ph_max_mtt_hierarchy_depth_inter_slice != 0 ) { | |
| ph_log2_diff_max_bt_min_qt_inter_slice | ue(v) |
| ph_log2_diff_max_tt_min_qt_inter_slice | ue(v) |
| } | |
| } | |
| if( cu_qp_delta_enabled_flag ) | |
| ph_cu_qp_delta_subdiv_inter_slice | ue(v) |
| if( pps_cu_chroma_qp_offset_list_enabled_flag ) | |
| ph_cu_chroma_qp_offset_subdiv_inter_slice | ue(v) |
| if( sps_temporal_mvp_enabled_flag ) { | |
| ph_temporal_mvp_enabled_flag | u(1) |
| if( ph_temporal_mvp_enabled_flag && rpl_info_in_ph_flag ) { | |
| ph_collocated_from_l0_flag | u(1) |
| if( ( ph_collocated_from_l0_flag && | |
| num_ref_entries[ 0 ][ RplsIdx[ 0 ] ] > 1 ) \|\| | |
| ( !ph_collocated_from_l0_flag && | |
| num_ref_entries[ 1 ][ RplsIdx[ 1 ] ] > 1 ) ) | |
| ph_collocated_ref_idx | ue(v) |
| } | |
| } | |
| mvd_l1_zero_flag | u(1) |
| if( sps_fpel_mmvd_enabled_flag ) | |
| ph_fpel_mmvd_enabled_flag | u(1) |
| if( sps_bdof_pic_present_flag ) | |
| ph_disable_bdof_flag | u(1) |
| if( sps_dmvr_pic_present_flag ) | |
| ph_disable_dmvr_flag | u(1) |
| if( sps_prof_pic_present_flag ) | |
| ph_disable_prof_flag | u(1) |
| if( ( pps_weighted_pred_flag \|\| pps_weighted_bipred_flag ) && wp_info_in_ph_flag ) | |
| pred_weight_table( ) | |
| } | |
| if( qp_delta_info_in_ph_flag ) | |
| ph_qp_delta | se(v) |
| if( sps_joint_cbcr_enabled_flag ) | |
| ph_joint_cbcr_sign_flag | u(1) |
| if( sps_sao_enabled_flag && sao_info_in_ph_flag ) { | |
| ph_sao_luma_enabled_flag | u(1) |
| if( ChromaArrayType != 0 ) | |
| ph_sao_chroma_enabled_flag | u(1) |
| } | |
| if( sps_dep_quant_enabled_flag ) | |
| ph_dep_quant_enabled_flag | u(1) |
| if( sps_sign_data_hiding_enabled_flag && !ph_dep_quant_enabled_flag ) | |
| pic_sign_data_hiding_enabled_flag | u(1) |
| if( deblocking_filter_override_enabled_flag && dbf_info_in_ph_flag ) { | |
| ph_deblocking_filter_override_flag | u(1) |
| if( ph_deblocking_filter_override_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |

TABLE 2-continued

```
                                                        Descriptor
      }
    }
  }
  if( picture_header_extension_present_flag ) {
    ph_extension_length                                 ue(v)
    for( i = 0; i < ph_extension_length; i++)
      ph_extension_data_byte[ i ]                       u(8)
  }
}
```

Semantic of Selected Syntax Elements ph_temporal_mvp_enabled_flag specifies whether temporal motion vector predictors can be used for inter prediction for slices associated with the picture header (PH). If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the Decoded Picture Buffer (DPB) has the same spatial resolution as the current picture, the value of ph_temporal_mvp_enabled_flag shall be equal to 0.

The maximum number of subblock-based merging MVP candidates, MaxNumSubblockMergeCand, is derived as follows:

```
if( sps_affine_enabled_flag )
  MaxNumSubblockMergeCand = 5 − five_minus_max_num_subblock_merge_cand      (1)
else
  MaxNumSubblockMergeCand =
    sps_sbtmvp_enabled_flag && ph_temporal_mvp_enabled_flag
```

The value of MaxNumSubblockMergeCand shall be in the range of 0 to 5, inclusive.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1. When slice_type is equal to B or P, ph_temporal_mvp_enabled_flag is equal to 1, and slice_collocated_from_l0_flag is not present, the following applies:

If rpl_info_in_ph_flag is equal to 1, slice_collocated_from_l0_flag is inferred to be equal to ph_collocated_from_l0_flag.

Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:

If rpl_info_in_ph_flag is equal to 1, the value of slice_collocated_ref_idx is inferred to be equal to ph_collocated_ref_idx.

Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag?0:1][slice_collocated_ref_idx] shall be equal to 0.

It is noted that the values of RprConstraintsActive[i][j] is derived in the section 8.3.2 in the VVC specification as abstracted below.

Decoding Process for Reference Picture Lists Construction

This process is invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in clause 8.3.3 or in decoding of the slice data.

For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], and the reference picture scaled flags RprConstraintsActive[0][j] and RprConstraintsActive[1][j] are derived as follows:

```
for( i = 0; i < 2; i++ ) {
        for( j = 0, k = 0, pocBase = PicOrderCntVal; j < num_ref_entries[ i ][ RplsIdx[ i ] ];
j++) {
                if( !inter_layer_ref_pic_flag[ i ][ RplsIdx[ i ] ][ j ] ) {
                     if( st_ref_pic_flag[ i ][ RplsIdx[ i ] ][ j ] ) {
                          RefPicPocList[ i ][ j ] =
pocBase − DeltaPocValSt[ i ][ RplsIdx[ i ] ][ j ]
                               if( there is a reference picture picA in the DPB with the same
nuh_layer_id as the current picture
                                       and PicOrderCntVal equal to
RefPicPocList[ i ][ j ] )
                               RefPicList[ i ][ j ] = picA
                          else
                               RefPicList[ i ][ j ] = "no reference picture"
                                                                                    (2)
                          pocBase = RefPicPocList[ i ][ j ]
                     } else {
                          if( !delta_poc_msb_cycle_lt[ i ][ k ] ) {
                               if( there is a reference picA in the DPB with the same
nuh_layer_id as the current picture and
                                       PicOrderCntVal & ( MaxPicOrderCntLsb − 1 )
equal to PocLsbLt[ i ][ k ] )
                                       RefPicList[ i ][ j ] = picA
                                  else
                                       RefPicList[ i ][ j ] = "no reference picture"
                                  RefPicLtPocList[ i ][ j ] = PocLsbLt[ i ][ k ]
                          } else {
                                  if( there is a reference picA in the DPB with the same
nuh_layer_id as the current picture and
                                                    PicOrderCntVal equal to
     FullPocLt[ i ][ k ] )
                                  RefPicList[ i ][ j ] = picA
                             else
                                  RefPicList[ i ][ j ] = "no reference picture"
                             RefPicLtPocList[ i ][ j ] = FullPocLt[ i ][ k ]
                          }
                          k++
            }
     } else {
            layerIdx =
            DirectRefLayerIdx[ GeneralLayerIdx[ nuh_layer_id ] ][ ilrp_idx[ i ][ R
            plsIdx ][ j ] ]
            refPicLayerId = vps_layer_id[ layerIdx ]
            if( there is a reference picture picA in the DPB with nuh_layer_id
            equal to refPicLayerId and
                    the same PicOrderCntVal as the current picture )
                    RefPicList[ i ][ j ] = picA
            else
                    RefPicList[ i ][ j ] = "no reference picture"
            }
            fRefWidth is set equal to PicOutputWidthL of the reference picture
            RefPicList[ i ][ j ]
            fRefHeight is set equal to PicOutputHeightL of the reference picture
            RefPicList[ i ][ j ]
            refPicWidth, refPicHeight, refScalingWinLeftOffset,
            refScalingWinRightOffset, refScalingWinTopOffset,
            and refScalingWinBottomOffset, are set equal to the values of
            pic_width_in_luma_samples,
            pic_height_in_luma_samples, scaling_win_left_offset,
            scaling_win_right_offset,
            scaling_win_top_offset, and scaling_win_bottom_offset, respectively,
            of the reference picture
            RefPicList[ i ][ j ]
     RefPicScale[ i ][ j ][ 0 ] =
     ( ( fRefWidth << 14 ) + ( PicOutputWidthL >> 1 ) ) / PicOutputWidthL
     RefPicScale[ i ][ j ][ 1 ] =
     ( ( fRefHeight << 14 ) + ( PicOutputHeightL >> 1 ) ) / PicOutputHeightL
     RprConstraintsActive[ i ][ j ] = ( pic_width_in_luma_samples != refPicWidth
     | |
                              pic_height_in_luma_samples != refPicHeight | |
                              scaling_win_left_offset != refScalingWinLeftOffset | |
                              scaling_win_right_offset != refScalingWinRightOffset
     | |
                              scaling_win_top_offset != refScalingWinTopOffset | |
```

-continued

```
                              scaling_win_bottom_offset !=
      refScalingWinBottomOffset )
      }
}
```

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf win_right_offset, pps_conf win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

```
PicOutputWidthL = pic_width_in_luma_samples −
                    SubWidthC * ( scaling_win_right_offset + scaling_win_left_offset )        (3)
PicOutputHeightL = pic_height_in_luma_samples −
        SubWidthC * ( scaling_win_bottom_offset + scaling_win_top_offset )        (4)
```

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:

PicOutputWidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidthInLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples−Max(8, MinCbSizeY)).

PicOutputHeightL*pic_height_max_in_luma_samples shall be greater than or equal to refPicOutputHeightL*(pic_height_in_luma_samples−Max(8, MinCbSizeY)).

NAL Unit Syntax

Similar to HEVC, in the VVC specification, one NAL unit header table with the total length of two bytes is signaled at the beginning of each NAL unit to specify the basic information of the NAL unit. Table 3 illustrates the syntax elements that exist in the current NAL unit header.

TABLE 3

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

In Table 3, the first bit is forbidden_zero_bit which is used to specify whether there is any error incurred during transmission. 0 means that the NAL unit is normal while 1 means there is syntax violation. Therefore, for normal bitstream, its corresponding value shall be equal to 0. The next bit is nuh_reserved_zero_bit which is reserved for future usage and shall be equal to 0. The following 6 bits are used to specify the value of the syntax nuh_layer_id which identify the layer to which the NAL unit belongs to. The value of nuh_layer_id shall be in the range of 0 to 55, inclusive. Other values for nuh_layer_id are reserved for future use. After that, the syntax element nal_unit_type is used to specify the NAL unit type, i.e., the type of RBSP data structure contained in the NAL unit as specified as in Table 4.

TABLE 4

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture*slice_layer_rbsp( ) | VCL |
| 1 | STSA_NUT | Coded slice of an STSA picture or subpicture*slice_layer_rbsp( ) | VCL |
| 2 | RADL_NUT | Coded slice of a RADL picture or subpicture*slice_layer_rbsp( ) | VCL |
| 3 | RASL_NUT | Coded slice of a RASL picture or subpicture*slice_layer_rbsp( ) | VCL |
| 4 . . . 6 | RSV_VCL_4 . . . RSV_VCL_6 | Reserved non-IRAP VCL NAL unit types | VCL |

TABLE 4-continued

| nal_unit_type | Name of nal_unit_type | Content of NAL unit and RBSP syntax structure | NAL unit type class |
|---|---|---|---|
| 7<br>8 | IDR_W_RADL<br>IDR_N_LP | Coded slice of an IDR picture or subpicture*slice_layer_rbsp( ) | VCL |
| 9 | CRA_NUT | Coded slice of a CRA picture or subpicture*slice_layer_rbsp( ) | VCL |
| 10 | GDR_NUT | Coded slice of a GDR picture or subpicture*slice_layer_rbsp( ) | VCL |
| 11<br>12 | RSV_IRAP_11<br>RSV_IRAP_12 | Reserved IRAP VCL NAL unit types | VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

Gradual Intra Refreshing

Figure 5:
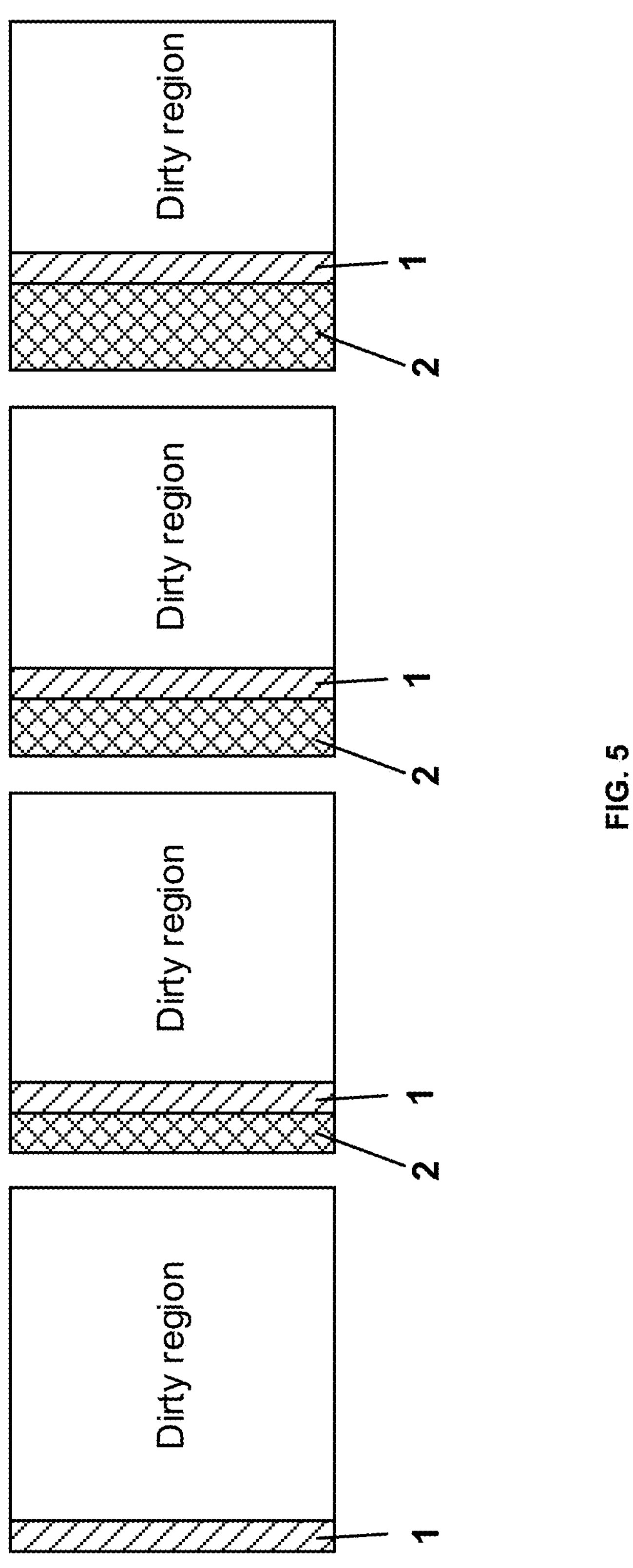
FIG. 5 illustrates intra coded regions among multiple inter pictures in accordance with some implementations of the present disclosure.

Low latency and error resilience are two important factors that should be considered for practical video transmission system. Intra refreshing, which periodically insert IRAP pictures, is commonly used to limit the error propagation among temporal pictures and enhance the error resilience capability of the bit-stream. However, due to the fact that the coding efficiency of inter coding is much better than intra coding, the relatively big size of intra pictures could potentially cause a latency issue when they are sent through a network with fixed transmission rate. This can lead to undesirable network congestion and packet losses. To address such issue, gradual intra refreshing (GDR) was adopted into the VVC standard which spreads the intra coded regions among multiple inter pictures, as depicted in FIG. 5. As shown in FIG. 5, two regions are defined. Parts 2 represent clean region. A clean region corresponds to the pixels which have been refreshed during the current GDR period and the dirty region corresponds to one area which has not been refreshed. Parts 1 represent the coding blocks where intra coding is applied. The principle of the GDR is to ensure that pixels from clean region are reconstructed using pixels coming only from refreshed area of the temporal reference pictures in the same GDR period. In the current VVC, there are three GDR-related syntax elements ph_gdr_or_irap_pic_flag, ph_gdr_pic_flag and ph_recovery_poc_cnt signaled in the picture header. Table 5 illustrates the corresponding GDR signaling in the picture header and the associated semantics.

TABLE 5

| | Descriptor |
|---|---|
| picture_header_structure( ) { | |
| ph_gdr_or_irap_pic_flag | u(1) |
| if( ph_gdr_or_irap_pic_flag ) | |
| ph_gdr_pic_flag | u(1) |
| ph_inter_slice_allowed_flag | u(1) |
| if( ph_inter_slice_allowed_flag ) | |
| ph_intra_slice_allowed_flag | u(1) |
| ph_non_ref_pic_flag | u(1) |
| ph_pic_parameter_set_id | ue(v) |
| ph_pic_order_cnt_lsb | u(v) |
| if( ph_gdr_or_irap_pic_flag ) | |
| ph_no_output_of_prior_pics_flag | u(1) |
| if( ph_gdr_pic_flag ) | |
| ph_recovery_poc_cnt | ue(v) |

ph_gdr_or_irap_pic_flag equal to 1 specifies that the current picture is a GDR or IRAP picture. ph_gdr_or_irap_pic_flag equal to 0 specifies that the current picture is not a GDR picture and may or may not be an IRAP picture.

ph_gdr_pic_flag equal to 1 specifies the picture associated with the PH is a GDR picture. ph_gdr_pic_flag equal to 0 specifies that the picture associated with the PH is not a GDR picture. When not present, the value of ph_gdr_pic_flag is inferred to be equal to 0. When sps_gdr_enabled_ flag is equal to 0, the value of ph_gdr_pic_flag shall be equal to 0.

When ph_gdr_or_irap_pic_flag is equal to 1 and ph_gdr_pic_flag is equal to 0, the picture associated with the PH is an IRAP picture.

ph_recovery_poc_cnt specifies the recovery point of decoded pictures in output order. When the current picture is a GDR picture, the variable recoveryPointPocVal is derived as follows:

$$recoveryPointPocVal = PicOrderCntVal + \text{ph\_recovery\_poc\_cnt} \quad (5)$$

If the current picture is a GDR picture, and there is a picture picA that follows the current GDR picture in decoding order in the CLVS that has PicOrderCntVal equal to recoveryPointPocVal, the picture picA is referred to as the recovery point picture. Otherwise, the first picture in output order that has PicOrderCntVal greater than recoveryPointPocVal in the CLVS is referred to as the recovery point picture. The recovery point picture shall not precede the current GDR picture in decoding order. The pictures that are associated with the current GDR picture and have PicOrderCntVal less than recoveryPointPocVal are referred to as the recovering pictures of the GDR picture. The value of ph_recovery_poc_cnt shall be in the range of 0 to MaxPicOrderCntLsb−1, inclusive.

When sps_gdr_enabled_flag is equal to 1 and PicOrderCntVal of the current picture is greater than or equal to recoveryPointPocVal of the associated GDR picture, the current and subsequent decoded pictures in output order are exact match to the corresponding pictures produced by starting the decoding process from the previous IRAP picture, when present, preceding the associated GDR picture in decoding order.

Mixed NAL Types in One Picture

Different from the HEVC standard where the NAL types of the slices within one picture have to be the same, it is allowed to have the mix if IRAP and non-IRAP NAL unit types within one picture. The motivation of such functionality is region-based random access using sub-pictures. For example, for 360-degree video streaming, some areas of one 360-degree video can be watched a lot more by users than the other areas. To better trade-off coding efficiency and the average viewpoint switching latency, more frequent IRAP pictures can be used to code those more-often-watched areas than the other area. For such reason, one flag pps_mixed_nalu_types_in_pic_flag is introduced in the PPS. When the flag is equal to one, it indicates that each picture referring to the PPS has more than one NAL unit and the NAL units do not have the same value of nal_unit_type. Otherwise (when the flag is equal to zero), each picture referring to the PPS has one or more NAL units and the NAL units of each picture referring to the PPS have the same value of nal_unit_type. Additionally, the flag pps_mixed_nalu_types_in_pic_flag is equal to one, one bit-stream conformance constraint is further applied that for any particular picture some NAL units have a particular IRAP NAL unit type and the other have a particular non-IRAP NAL unit type. In other words, NAL units of any particular picture cannot have more than one IRAP NAL unit type and cannot have more than one non-IRAP NAL unit type, as specified as below.

For VCL NAL units of any particular picture, the following applies:

- If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.
- Otherwise (pps_mixed_nalu_types_in_pic_flag is equal to 1), the following applies:
  - The picture shall have at least two subpictures.
  - VCL NAL units of the picture shall have two or more different nal_unit_type values.
  - There shall be no VCL NAL unit of the picture that has nal_unit_type_equal to GDR_NUT.
  - When the VCL NAL units of at least one subpicture of the picture have a particular value of nal_unit_type equal to IDR_W_RADL, IDR_N_LP, or CRA_NUT, the VCL NAL units of other subpictures in the picture shall all have nal_unit_type equal to TRAIL_NUT.

In current VVC, mvd_l1_zero_flag is signaled in the picture header (PH) without any conditional constraint. However, the feature controlled by the flag mvd_l1_zero_flag is only applicable when the slice is a bi-predictive slice (B-slice). Therefore, the flag signaling is redundant when the slice associated with the picture header is not a B-slice.

Similarly, in another example, ph_disable_bdof_flag and ph_disable_dmvr_flag are signaled in the PH only when the corresponding enabling flags (sps_bdof_pic_present_flag, sps_dmvr_pic_present_flag) signaled in sequence parameter set (SPS) are true, respectively. As shown in Table 6, however, the features controlled by the flags ph_disable_bdof_flag and ph_disable_dmvr_flag are only applicable when the slice is a bi-predictive slice (B-slice). Therefore, the signaling of these two flags is redundant or useless when the slices associated with the picture header is not a B-slice.

TABLE 6

```
if( sps_bdof_pic_present_flag )
  ph_disable_bdof_flag
if( sps_dmvr_pic_present_flag )
  ph_disable_dmvr_flag
```

One more example can also be seen on the syntax elements ph_collocated_from_l0_flag to indicate the collocatd picture is from list 0 or list1, as shown in Table 7. And another example can be seen on the syntax pred_weight_table( ) which are the syntax elements related to the weighting tabled for the bi-predictive prediction, as shown in Table 8.

TABLE 7

```
if( ph_temporal_mvp_enabled_flag && rpl_info_in_ph_flag ) {
        ph_collocated_from_l0_flag
```

TABLE 8

| | Descriptor |
|---|---|
| if( ( pps_weighted_pred_flag | | pps_weighted_bipred_flag ) && wp_info_in_ph_flag ) | |
|     pred_weight_table( ) { | |
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |

TABLE 8-continued

```
                                                        Descriptor
        delta_luma_weight_l0[ i ]                       se(v)
        luma_offset_l0[ i ]                             se(v)
      }
      if( chroma_weight_l0_flag[ i ] )
        for( j = 0; j < 2; j++ ) {
          delta_chroma_weight_l0[ i ][ j ]              se(v)
          delta_chroma_offset_l0[ i ][ j ]              se(v)
        }
    }
    if(  pps_weighted_bipred_flag   &&
    wp_info_in_ph_flag )
      num_l1_weights                                    ue(v)
    for( i = 0; i < NumWeightsL1; i++ )
      luma_weight_l1_flag[ i ]                          u(1)
    if( ChromaArrayType != 0 )
      for( i = 0; i < NumWeightsL1; i++ )
        chroma_weight_l1_flag[ i ]                      u(1)
    for( i = 0; i < NumWeightsL1; i++ ) {
      if( luma_weight_l1_flag[ i ] ) {
        delta_luma_weight_l1[ i ]                       se(v)
        luma_offset_l1[ i ]                             se(v)
      }
      if( chroma_weight_l1_flag[ i ] )
        for( j = 0; j < 2; j++ ) {
          delta_chroma_weight_l1[ i ][ j ]              se(v)
          delta_chroma_offset_l1[ i ][ j ]              se(v)
        }
    }
  }
```

A problem is associated with the syntax ph_temporal_mvp_enabled_flag. In current VVC, because the resolution of the collocated picture selected for TMVP (Temporal motion Vector Prediction) derivation shall be the same as the resolution of the current picture, there is a bitstream conformance constraint to check the value of ph_temporal_mvp_enabled_flag as illustrated below:

when no reference picture in the DPB has the same spatial resolution as the current picture, the value of ph_temporal_mvp_enabled_flag shall be equal to 0.

However, in current VVC, not only the resolution of the collocated picture will affect the enabling of TMVP, but also the offsets that are applied to the picture size for scaling ratio calculation affect the enabling of TMVP. In current VVC, however, the offsets are not considered in the bitstream conformance of ph_temporal_mvp_enabled_flag.

Moreover, there is a requirement of bitstream conformance that the picture referred to by slice_collocated_ref_idx shall be the same for all slices of a coded picture. However, when a coded picture has multiple slices and there is no common reference picture existing among all these slices, this bitstream conformance has no chance to be met. And in such case, ph_temporal_mvp_enabled_flag should be constrained to be 0.

According to the current VVC specification, IRAP picture is referred to be as one picture where all the associated NAL units having the same nal_unit_type which belongs to the IRAP NAL types. Specifically, the description in the below is used to define the IRAP picture in the VVC specification:

intra random access point (IRAP) picture: A coded picture for which all VCL NAL units have the same value of nal_unit_type in the range of IDR_W_RADL to CRA_NUT, inclusive.

An IRAP picture does not use inter prediction in its decoding process, and may be a CRA picture or an IDR picture. The first picture in the bitstream in decoding order must be an IRAP or GDR picture. Provided the necessary parameter sets are available when they need to be referenced, the IRAP picture and all subsequent non-RASL pictures in the CLVS in decoding order can be correctly decoded without performing the decoding process of any pictures that precede the IRAP picture in decoding order.

The value of pps_mixed_nalu_types_in_pic_flag for an IRAP picture is equal to 0. When pps_mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an IRAP picture.

As can be seen from the above, for each IRAP picture, the corresponding PPS that the picture refers to should have its pps_mixed_nalu_types_in_pic_flag equal to 0. Similarly, in the current VVC specification, GDR picture is referred to be as one picture for which the nal_unit_type of all the NALs associated with the picture shall be equal to GDR_NUT, as specified as:

gradual decoding refresh (GDR) picture: A picture for which each VCL NAL unit has nal_unit_type equal to GDR_NUT.

Given that all the NAL units of one GDR picture must have the same NAL types, the flag pps_mixed_nalu_types_in_pic_flag in the corresponding PPS that the GDR picture refers to cannot be equal to one.

On the other hand, two flags, i.e., ph_gdr_or_irap_pic_flag and ph_gdr_pic_flag, are signaled in picture header to indicate whether one picture is one IRAP picture or one GDR picture. When the flag ph_gdr_or_irap_pic_flag is equal to one and the flag ph_gdr_pic_flag is equal to zero, the current picture is one IRAP picture. When the flag ph_gdr_or_irap_pic_flag is equal to one and the flag ph_gdr_pic_flag is equal to one, the current picture is one GDR picture. According to the current VVC specification, the two flags are allowed to be signaled as one or zero without considering the value of the flag pps_mixed_nalu_types_in_pic_flag in the PPS. However, as mentioned earlier, one picture can be one IRAP picture or one GDR picture only if the NAL units in the picture have the same nal_unit_type, i.e., the corresponding pps_mixed_nalu_types_in_pic_ flag has to be zero. Therefore, the existing IRAP/GDR signaling in the picture header is problematic when either or both of ph_gdr_or_irap_pic_flag and ph_gdr_pic_flag is equal to one (i.e., indicating the current picture is either IRAP picture or GDR picture) and the corresponding pps_mixed_naly_types_in_pic_flag is equal to one (i.e., indicating there are multiple NAL types in the current picture).

Since the features controlled by the flags mvd_l1_zero_flag, ph_disable_bdof_flag and ph_disable_dmvr_flag are only applicable when the slice is a bi-predictive slice (B-slice), according to a method of the disclosure, it is proposed to signal these flags only when the associated slices are B-slices. It is noted that when the reference picture lists are signaled in PH (e.g., rpl_info_in_ph_flag=1), it means all the slices of the coded picture use the same reference pictures signaled in PH. Therefore, when the reference picture lists are signaled in PH and the signaled reference picture lists indicate that the current picture is not bi-predictive, the flags mvd_l1_zero_flag, ph_disable_bdof_flag and ph_disable_dmvr_flag need not to be signaled. In the first embodiment, some conditions are added to those syntaxes sent in picture header (PH) to prevent redundant signaling or undefined decoding behavior due to improper values sent for some of the syntaxes in the picture header. Some examples based on the embodiment are illustrated below, wherein variables num_ref_entries[i][RplsIdx[i]] represent the number of reference pictures in the list i.

```
If (!rpl_info_in_ph_flag || (rpl_info_in_ph_flag && num_ref_entries[ 0 ][ RplsIdx[ 0 ] ] > 0
&& num_ref_entries[ 1 ][ RplsIdx[ 1 ] ] > 0 ))
        mvd_l1_zero_flag
```

Alternatively, the conditions can be written in a more compact form which gives the same results. Because a bi-predictive slice (B-slice) or bi-predictive picture must have at least one list1 reference picture, it can only check whether current slice/picture has list1 reference picture. An example of the alternative condition checking is illustrated below:

```
If (!rpl_info_in_ph_flag || (rpl_info_in_ph_flag && num_ref_entries[ 1 ][ RplsIdx[ 1 ] ] > 0
))
        mvd_l1_zero_flag
```

The semantics of mvd_l1_zero_flag is also modified to handle the case when it is not signaled.

mvd_l1_zero_flag equal to 1 indicates that the mvd_coding(x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding (x0, y0, 1) syntax structure is parsed. When not present, the value of mvd_l1_zero_flag is inferred to be 0.

Several examples of conditionally signalling the syntax element ph_disable_dmvr_flag are illustrated below:

```
If (sps_dmvr_pic_present_flag && (!rpl_info_in_ph_flag||(rpl_info_in_ph_flag &&
num_ref_entries[ 0 ][ RplsIdx[ 0 ] ] > 0 && num_ref_entries[ 1 ][ RplsIdx[ 1 ] ] > 0)) )
        ph_disable_dmvr_flag
      Similarly, an example of the alternative condition checking is illustrated below:
If (sps_dmvr_pic_present_flag && (!rpl_info_in_ph_flag || (rpl_info_in_ph_flag &&
num_ref_entries[ 1 ][ RplsIdx[ 1 ] ] > 0)) )
        ph_disable_dmvr_flag
```

The semantics of ph_disable_dmvr_flag is also modified to handle the case when it is not signaled.

ph_disable_dmvr_flag equal to 1 specifies that decoder motion vector refinement based inter bi-prediction is disabled in the slices associated with the PH. ph_disable_dmvr_ flag equal to 0 specifies that decoder motion vector refinement based inter bi-prediction may or may not be enabled in the slices associated with the PH.

When ph_disable_dmvr_flag is not present, the following applies:

- If sps_dmvr_enabled_flag is equal to 1 and sps_dmvr_pic_present_flag is equal to 0, the value of ph_disable_dmvr_flag is inferred to be equal to 0.
- Else if sps_dmvr_enabled_flag is equal to 1 and sps_dmvr_pic_present_flag is equal to 1, the value of ph_disable_dmvr_flag is inferred to be equal to 1.
- Otherwise (sps_dmvr_enabled_flag is equal to 0), the value of ph_disable_dmvr_flag is inferred to be equal to 1.

An alternative way to derive the value of ph_disable_dmvr_flag when it is not presented is illustrated below:

- If all the conditions are considered for the derivation of the value of ph_disable_dmvr_flag when it is either explicitly signalled or implicitly derived: If sps_dmvr_enabled_flag is equal to 1 and sps_dmvr_pic_present_flag is equal to 0, the value of ph_disable_dmvr_flag is inferred to be equal to 0.
- Else if sps_dmvr_enabled_flag is equal to 0 and sps_dmvr_pic_present_flag is equal to 0, the value of ph_disable_dmvr_flag is inferred to be equal to 1.
- Else if sps_dmvr_enabled_flag is equal to 1 and sps_dmvr_pic_present_flag is equal to 1 and rpl_info_in_ph_flag is equal to 0, the value of ph_disable_dmvr_flag is inferred to be equal to X. (X is explicitly signalled)
- Else if sps_dmvr_enabled_flag is equal to 1 and sps_dmvr_pic_present_flag is equal to 1 and rpl_info_in_ph_flag is equal to 1 and num_ref_entries[1][RplsIdx[1]]>0, the value of ph_disable_dmvr_flag is inferred to be equal to X. (X is explicitly signalled)
- Else (sps_dmvr_enabled_flag is equal to 1 and sps_dmvr_pic_present_flag is equal to 1 and rpl_info_in_ph_flag is equal to 1 and num_ref_entries[1][RplsIdx[1]]==0), the value of ph_disable_dmvr_flag is inferred to be equal to 1.

Since the syntax element ph_disable_dmvr_flag is explicitly signalled under the third and the fourth conditions, they can be removed from the derivation of ph_disable_dmvr_flag when ph_disable_dmvr_flag is not present: When ph_disable_dmvr_flag is not present, the following applies:

- If sps_dmvr_enabled_flag is equal to 1 and sps_dmvr_pic_present_flag is equal to 0, the value of ph_disable_dmvr_flag is inferred to be equal to 0.
- Else if sps_dmvr_enabled_flag is equal to 0 and sps_dmvr_pic_present_flag is equal to 0, the value of ph_disable_dmvr_flag is inferred to be equal to 1.

Else (sps_dmvr_enabled_flag is equal to 1 and sps_dmvr_pic_present_flag is equal to 1 and rpl_info_in_ph_flag is equal to 1 and num_ref_entries[1] [RplsIdx[1] ]==0), the value of ph_disable_dmvr_flag is inferred to be equal to 1.

The conditions can be editorially simplified as below:

When ph_disable_dmvr_flag is not present, the following applies:

If sps_dmvr_enabled_flag is equal to 1 and sps_dmvr_pic_present_flag is equal to 0, the value of ph_disable_dmvr_flag is inferred to be equal to 0.

Otherwise (sps_dmvr_enabled_flag is equal to 0 or sps_dmvr_pic_present_flag is equal to 1), the value of ph_disable_dmvr_flag is inferred to be equal to 1.

Another alternative way to derive the value of ph_disable_dmvr_flag when it is not presented is illustrated below:

When ph_disable_dmvr_flag is not present, the following applies:

If sps_dmvr_pic_present_flag is equal to 0, the value of ph_disable_dmvr_flag is inferred to be equal to 1−sps_dmvr_enabled_flag.

Else if sps_dmvr_pic_present_flag is equal to 1 and rpl_info_in_ph_flag is equal to 0, the value of ph_disable_dmvr_flag is inferred to be equal to 1−sps_dmvr_enabled_flag.

Else if sps_dmvr_pic_present_flag is equal to 1 and rpl_info_in_ph_flag is equal to 1 and num_ref_entries [1][RplsIdx[1]]>0, the value of ph_disable_dmvr_flag is inferred to be equal to 1−sps_dmvr_enabled_flag.

Else (sps_dmvr_pic_present_flag is equal to 1 and rpl_info_in_ph_flag is equal to 1 and num_ref_entries[1] [RplsIdx[1]]==0), the value of ph_disable_dmvr_flag is inferred to be equal to 1.

Since the syntax element ph_disable_dmvr_flag is explicitly signalled under the second and the third conditions, they can be removed from the derivation of ph_disable_dmvr_flag when it is not present:

When ph_disable_dmvr_flag is not present, the following applies:

If sps_dmvr_pic_present_flag is equal to 0, the value of ph_disable_dmvr_flag is inferred to be equal to 1−sps_dmvr_enabled_flag.

Otherwise, the value of ph_disable_dmvr_flag is inferred to be equal to 1.

Several examples of conditionally signalling the syntax element ph_disable_bdof_flag

```
If (sps_bdof_pic_present_flag&&(!rpl_info_in_ph_flag|| (rpl_info_in_ph_flag &&
num_ref_entries[ 0 ][ RplsIdx[ 0 ] ] > 1 && num_ref_entries[ 1 ][ RplsIdx[ 1 ] ] > 1)) )
        ph_disable_bdof_flag
```

-

Similarly, an example of the alternative condition checking is illustrated below:

```
If (sps_bdof_pic_present_flag&&(!rpl_info_in_ph_flag||(rpl_info_in_ph_flag &&
num_ref_entries[ 1 ][ RplsIdx[ 1 ] ] > 0)) )
        ph_disable_bdof_flag
```

The semantics of ph_disable_bdof_flag is also modified to handle the case when it is not signaled.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:

- If sps_bdof_enabled_flag is equal to 1 and sps_bdof_pic_present_flag is equal to 0, the value of ph_disable_bdof_flag is inferred to be equal to 0.
- Else if sps_bdof_enabled_flag is equal to 1 and sps_bdof_pic_present_flag is equal to 1, the value of ph_disable_dmvr_flag is inferred to be equal to 1.
- Otherwise (sps_bdof_enabled_flag is equal to 0, the value of ph_disable_bdof_flag is inferred to be equal to 1.

An alternative way to derive the value of ph_disable_bdof_flag when it is not presented is illustrated below:

If all the conditions are considered for the derivation of the value of ph_disable_bdof_flag when it is either explicitly signalled or implicitly derived:

- If sps_bdof_enabled_flag is equal to 1 and sps_bdof_pic_present_flag is equal to 0, the value of ph_disable_bdof_flag is inferred to be equal to 0.
- Else if sps_bdof_enabled_flag is equal to 0 and sps_bdof_pic_present_flag is equal to 0, the value of ph_disable_bdof_flag is inferred to be equal to 1.
- Else if sps_bdof_enabled_flag is equal to 1 and sps_bdof_pic_present_flag is equal to 1 and rpl_info_in_ph_flag is equal to 0, the value of ph_disable_bdof_flag is inferred to be equal to X. (X is explicitly signalled)
- Else if sps_bdof_enabled_flag is equal to 1 and sps_bdof_pic_present_flag is equal to 1 and rpl_info_in_ph_flag is equal to 1 and num_ref_entries[1][RplsIdx[1]] >0, the value of ph_disable_bdof_flag is inferred to be equal to X. (X is explicitly signalled)
- Else (sps_bdof_enabled_flag is equal to 1 and sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

Since the syntax element ph_disable_bdof_flag is explicitly signalled under the third and the fourth conditions, they can be removed from the derivation of ph_disable_bdof_flag when ph_disable_bdof_flag is not present:

When ph_disable_bdof_flag is not present, the following applies:

- If sps_bdof_enabled_flag is equal to 1 and sps_bdof_pic_present_flag is equal to 0, the value of ph_disable_bdof_flag is inferred to be equal to 0.
- Else if sps_bdof_enabled_flag is equal to 0 and sps_bdof_pic_present_flag is equal to 0, the value of ph_disable_bdof_flag is inferred to be equal to 1.
- Else (sps_bdof_enabled_flag is equal to 1 and sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

The conditions can be editorially simplified as below:

When ph_disable_bdof_flag is not present, the following applies:

- If sps_bdof_enabled_flag is equal to 1 and sps_bdof_pic_present_flag is equal to 0, the value of ph_disable_bdof_flag is inferred to be equal to 0.
- Otherwise (sps_bdof_enabled_flag is equal to 0 or sps_bdof_pic_present_flag is equal to 1), the value of ph_disable_bdof_flag is inferred to be equal to 1.

Another alternative way to derive the value of ph_disable_bdof_flag when it is not presented is illustrated below:

When ph_disable_bdof_flag is not present, the following applies:

- If sps_bdof_pic_present_flag is equal to 0, the value of ph_disable_bdof_flag is inferred to be equal to 1−sps_bdof_enabled_flag.
- Else if sps_bdof_pic_present_flag is equal to 1 and rpl_info_in_ph_flag is equal to 0, the value of ph_disable_bdof_flag is inferred to be equal to 1−sps_bdof_enabled_flag.
- Else if sps_bdof_pic_present_flag is equal to 1 and rpl_info_in_ph_flag is equal to 1 and num_ref_entries[1][RplsIdx[1]]>0, the value of ph_disable_bdof_flag is inferred to be equal to 1−sps_bdof_enabled_flag.
- Else (sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

Since the syntax element ph_disable_bdof_flag is explicitly signalled under the second and the third conditions, they can be removed from the derivation of ph_disable_bdof_flag when it is not present:

When ph_disable_bdof_flag is not present, the following applies:

- If sps_bdof_pic_present_flag is equal to 0, the value of ph_disable_bdof_flag is inferred to be equal to 1−sps_bdof_enabled_flag.
- Otherwise, the value of ph_disable_bdof_flag is inferred to be equal to 1.

Moreover, the signalling conditions for syntax elements ph_collocated_from_l0_flag and weight_table( ) are modified because the two types of syntax elements are only applicable when the associated slices are B-slices. Examples of the modified syntax elements signaling are illustrated in Tables 9-11 below.

TABLE 9

```
if( ph_temporal_mvp_enabled_flag && (num_ref_entries[ 0 ][ RplsIdx[ 0 ] ] > 0 &&
num_ref_entries[ 1 ][ RplsIdx[ 1 ] ] > 0))) {
        ph_collocated_from_l0_flag
```

The semantics of ph_collocated_from_l0_flag is also modified to handle the case when it is not signaled.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

When ph_collocated_from_l0_flag is not present, the following applies:

- If num_ref_entries[0][RplsIdx[0] ] is larger than 1, the value of ph_collocated_from_l0_flag is inferred to be 1.

Otherwise (num_ref_entries[1][RplsIdx[1] ] is larger than 1), the value of ph_collocated_from_l0_flag is inferred to be 0.

TABLE 10

```
if( ( pps_weighted_pred_flag | | pps_weighted_bipred_flag ) && wp_info_in_ph_flag
flag)
        pred_weight_table( )
```

TABLE 11

| | Descriptor |
|---|---|
| pred_weight_table( ) { | |
| luma_log2_weight_denom | ue(v) |
| if( ChromaArrayType != 0 ) | |
| delta_chroma_log2_weight_denom | se(v) |
| if( wp_info_in_ph_flag ) | |
| num_l0_weights | ue(v) |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| if ( pps_weighted_bipred_flag && wp_info_in_ph_flag && (!rpl_info_in_ph_flag \|\| (rpl_info_in_ph_flag && num_ref_entries[ 0 ][ RplsIdx[ 0 ] ] > 0&& num_ref_entries[ 1 ][ RplsIdx[ 1 ] ] > 0))) | |
| num_l1_weights | ue(v) |
| for( i = 0; i < NumWeightsL1; i++ ) | |
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

Similarly, an example of the alternative condition checking is illustrated below: if(pps_weighted_bipred_flag && wp_info_in_ph_flag && (!rpl_info_in_ph_flag||(rpl_info_in_ph_flag && num_ref_entries[1][RplsIdx[1]]>0))) num_l1_weights The semantics of the syntax elements in pred_weight_table( ) are also modified to handle the case when they are not signaled.

num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1] ]), inclusive.

The variable NumWeightsL1 is derived as follows:

```
if( !pps_weighted_bipred_flag)
    NumWeightsL1 = 0
else if (wp_info_in_ph_flag && rpl_info_in_ph_flag && (num_ref_entries[ 0 ][
RplsIdx[ 0 ] ] ==0 || num_ref_entries[ 1 ][ RplsIdx[ 1 ] ] >==0))
    NumWeightsL1 = 0
else if( wp_info_in_ph_flag )                                        (6)
    NumWeightsL1 = num_l1_weights
else
    NumWeightsL1 = NumRefIdxActive[ 1 ]
```

In the semantics of the syntax elements in pred_weight_table( ), an alternative way to derive the value of num_l1_weights when it is not presented is illustrated below: num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1] ]), inclusive. When not present, the value of num_l1_weights is inferred to be 0.

The variable NumWeightsL1 is derived as follows:

```
if( !pps_weighted_bipred_flag)
        NumWeightsL1 = 0
else if( wp_info_in_ph_flag   )                                  (148)
        NumWeightsL1 = num_l1_weights
else
        NumWeightsL1 = NumRefIdxActive[ 1 ]
```

In the semantics of the syntax elements in pred_weight_table( ), another alternative way to derive the value of num_l1_weights when it is not presented is illustrated below:

```
if( !pps_weighted_bipred_flag | | ( wp_info_in_ph_flag && num_ref_entries[ 1 ][ RplsIdx[
1 ] ] = = 0 ) )
        NumWeightsL1 = 0
else if( wp_info_in_ph_flag )
        NumWeightsL1 = num_l1_weights
else
        NumWeightsL1 = NumRefIdxActive[ 1 ]
```

Conceptually, it is proposed to add signaling condition to check whether the current picture has reference pictures from both list0 and list1 reference picture lists for any syntax elements which is only applicable in B slices to avoid signaling redundant bits. The checking condition is not limited to the above mentioned method to check the size of both reference picture lists (e.g., list 0/list1 reference picture lists) and the checking condition may be any other method to indicate whether current picture has reference pictures from both list0 and list1 reference picture lists. For example, a flag can be signaled to indicate whether current picture has both list0 and lits1 reference pictures.

When the syntax elements are not signaled and the reference picture list information is signaled in the PH, the values of the syntax elements are derived using the information whether current picture has both list0 and list1 reference pictures or it has only list0 or list1 reference pictures. In one example, when ph_collocated_from_l0_flag is not signaled, its value is inferred to be the only reference picture that current picture has. In another example, when sps_bdof_enabled_flag is equal to 1 and sps_bdof_pic_present_flag is equal to 1 but ph_disable_bdof_flag is not signalled, it implies that either num_ref_entries[0][RplsIdx[0]] is equal to 0 or num_ref_entries[1][RplsIdx[1] ] is equal to 0 according the proposed signalling condition on ph_disable_bdof_flag. Therefore, under this condition, ph_disable_bdof_flag is not signalled and is inferred as 1. In current VVC, not only the resolution of the collocated picture may affect the enabling of TMVP but also the offsets applied to the picture size for scaling ratio calculation may affect the enabling of TMVP. In current VVC, however, the offsets are not considered in the bitstream conformance of ph_temporal_mvp_enabled_flag. In the second embodiment, it is proposed to add a bitstream conformance constraint to the current VVC requiring that the value of ph_temporal_mvp_enabled_flag shall be dependent on the offsets that are applied to the picture size for scaling ratio calculation, as illustrated below When no reference picture in the DPB has the same spatial resolution and the same offsets that are applied to the picture size for scaling ratio calculation as the current picture, the value of ph_temporal_mvp_enabled_flag shall be equal to 0.

The above sentences can also be written in another way as below:

When no reference picture in the DPB has the associated variable value RprConstraintsActive[i][j] equal to 0, the value of ph_temporal_mvp_enabled_flag shall be equal to 0.

In current VVC, there is a requirement of bitstream conformance that the picture referred to by slice_collocated_ref_idx shall be the same for all slices of a coded picture. However, when the coded picture has multiple slices and there is no common reference picture existing among all these slices, this bitstream conformance has no chance to be met. In the third embodiment of the disclosure, the requirement of bitstream conformance on ph_temporal_mvp_enabled_flag is modified to consider whether there is a common reference picture existing among all the slices in the current picture. Based on the embodiment, several exemplar modifications to the VVC specification are illustrated below.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the slices associated with the PH, the value of ph_temporal_mvp_enabled_flag shall be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the inter slices associated with the PH, the value of ph_temporal_mvp_enabled_flag shall be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the non-intra slices associated with the PH, the value of ph_temporal_mvp_enabled_flag shall be equal to 0.

In one example, the bitstream conformance on slice_collocated_ref_idx is simplified as below:

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag?0:1][slice_collocated_ref_idx] shall be equal to 0.

When the value of pps_mixed_nalu_types_in_pic_flag is equal to one, each picture referring to the PPS has more than one NAL units and those NAL units do not have the same nal_unit_type. On the other hand, in the current picture header signaling, the values of ph_gdr_or_irap_pic_flag and ph_gdr_pic_flag are allowed to signaled as ones even when the value of the flag pps_mixed_nalu_types_in_pic_flag in the associated PPS is equal to one. Because the NAL units in one IRAP picture or one GDR picture must have the same nal_unit_type, such signaling scenario should not be allowed.

In one example, it is proposed to condition the presence of the flag ph_gdr_or_irap_pic_flag in the picture header on the value of pps_mixed_nalu_types_in_pic_flag in the PPS. Specifically, the ph_gdr_or_irap_pic_flag is only signaled when the value of pps_mixed_nalu_types_in_pic_flag is equal to zero. Otherwise, when the flag pps_mixed_nalu_types_in_pic_flag is equal to one, the flag ph_gdr_or_irap_pic_flag is not signaled and inferred to be zero. Table 12 is illustrated after the proposed modification is applied.

TABLE 12

| | Descriptor |
|---|---|
| picture_header_structure( ) { | |
| if( !pps_mixed_nalu_types_in_pic_flag ) | |
| ph_gdr_or_irap_pic_flag | u(1) |
| if( ph_gdr_or_irap_pic_flag ) | |
| ph_gdr_pic_flag | u(1) |

In one example, one bit-stream conformance constraint is propose to require that the corresponding value of the signaled flag ph_gdr_or_irap_pic_flag shall be equal to one when the flag pps_mixed_nalu_types_in_pic_flag is equal to one. Specifically, the proposed bit-stream conformance constraint can be specified as below.

ph_gdr_or_irap_pic_flag equal to 1 specifies that the current picture is a GDR or IRAP picture. ph_gdr_or_irap_pic_flag equal to 0 specifies that the current picture is not a GDR picture and may or may not be an IRAP picture. When the value of pps_mixed_nalu_types_in_pic_flag is equal to one, the value of ph_gdr_or_irap_pic_flag shall be equal to zero.

In one example, it is proposed to move the signaling of pps_mixed_nalu_types_in_pic_flag from PPS level to picture level, slice level or other coding level. For instance, assuming the flag is moved to picture header, the flag can be renamed as ph_mixed_nalu_type_in_pic_flag. Additionally, it is proposed to use the flag to condition the signaling of ph_gdr_or_irap_pic_flag. Specifically, the ph_gdr_or_rap_pic_flag is only signaled when the flag ph_mixed_nalu_type_in_pic_flag is equal to zero. Otherwise, when the flag ph_mixed_nalu_type_in_pic_flag is one, the flag ph_gdr_or_ rap_pic_flags is not signaled and inferred to be zero. In another example, it is proposed to add bit-stream conformance constraint that the value of ph_gdr_or_irap_pic_flag should be equal to zero when the value of ph_mixed_nalu_type_in_pic_flag is equal to one. In yet another example, it is proposed to use ph_gdr_or_irap_pic_flag to condition the presence of ph_mixed_nalu_type_in_pic_flag. Specifically, the flag ph_mixed_nalu_type_in_pic_flag is only signaled when the value of ph_gdr_or_rap_pic_flag is equal to zero. Otherwise, when the value of ph_gdr_or_rap_pic_flag is equal to one, the flag ph_mixed_nalu_type_in_pic_flag is not signaled and always inferred to be zero.

In one example, it is proposed to apply the value of pps_mixed_nalu_types_in_pic_flag only to the pictures that are neither IRAP nor GDR pictures. Specifically, by such method, the semantic of pps_mixed_nalu_types_in_pic_flag should be modified as follows:

pps_mixed_nalu_types_in_pic_flag equal to 1 specifies that each picture that is neither IRAP nor GDR picture referring to the PPS has more than one VCL NAL unit and the VCL NAL units do not have the same value of nal_unit_type. pps_mixed_nalu_types_in_pic_flag equal to 0 specifies that each picture that is neither IRAP nor GDR picture referring to the PPS has one or more VCL NAL units and the VCL NAL units of each picture referring to the PPS have the same value of nal_unit_type.

On the other hand, in the current VVC specification, it is required that all the NAL units in one GDR picture have to have the same nal_unit_type which is equal to GDR_NUT. The following bit-stream conformance constraint is applied to the definition of the GDR picture such that the corresponding value of pps_mixed_nal_types_in_pic_flag should be equal to zero.

gradual decoding refresh (GDR) picture: A picture for which each VCL NAL unit has nal_unit_type equal to GDR_NUT. The value of pps_mixed_nalu_types_in_pic_flag for an GDR picture is equal to 0. When pps_mixed_nalu_types_in_pic_flag is equal to 0 for a picture, and any slice of the picture has nal_unit_type is GDR_NUT, all other slices of the picture have the same value of nal_unit_type, and the picture is known to be an GDR picture after receiving the first slice of the picture.

In another embodiment, it is proposed to remove the GDR NAL unit type from NAL unit header while only use the syntax elements ph_gdr_or_irap_pic_flag and ph_gdr_pic_flag to indicate whether the current picture is GDR picture or not.

Different from the above methods where the constraint of pps_mixed_nalu_types_in_pic_flag is applied to both IRAP and GDR pictures, in the following, three methods are proposed where the constraint is applied to IRAP picture but not to GDR picture.

In one example, it is proposed to condition the presence of the flag ph_gdr_pic_flag in the picture header on the value of pps_mixed_nalu_types_in_pic_flag in the PPS. Specifically, the flag ph_gdr_pic_flag is only signaled when the value of pps_mixed_nalu_types_in_pic_flag is equal to zero. Otherwise, when the flag pps_mixed_nalu_types_in_pic_flag is equal to one, the flag ph_gdr_pic_flag is not signaled and inferred to be zero, i.e., the current picture cannot be one GDR picture. The corresponding picture header table (Table 13) is modified as follows after the proposed signaling condition is applied.

TABLE 13

| | Descriptor |
|---|---|
| picture_header_structure( ) { | |
| ph_gdr_or_irap_pic_flag | u(1) |
| if( pps_mixed_nalu_types_in_pic_flag == 0 && ph_gdr_or_irap_pic_flag ) | |
| ph_gdr_pic_flag | u(1) |

ph_gdr_pic_flag equal to 1 specifies the picture associated with the PH is a GDR picture. ph_gdr_pic_flag equal to 0 specifies that the picture associated with the PH is not a GDR picture. When not present, the value of ph_gdr_pic_flag is inferred to be equal to 0 when pps_mixed_nalu_types_in_pic_flag is 0 and to be equal to the value of ph_gdr_or_irap_pic_flag when pps_mixed_nalu_types_in_pic_flag is 1. When sps_gdr_enabled_flag is equal to 0, the value of ph_gdr_pic_flag shall be equal to 0.

In one example, it is proposed to introduce one bit-stream conformance constraint that ph_gdr_pic_flag should be equal to 1 when ph_gdr_or_irap_pic_flag is 1 and pps_mixed_nalu_types_in_pic_flag is 1, as specified as:

ph_gdr_pic_flag equal to 1 specifies the picture associated with the PH is a GDR picture. ph_gdr_pic_flag equal to 0 specifies that the picture associated with the PH is not a GDR picture. When not present, the value of ph_gdr_pic_flag is inferred to be equal to 0. When sps_gdr_enabled_flag is equal to 0, the value of ph_gdr_pic_flag shall be equal to 0. The value of ph_gdr_pic_flag should be equal to 1, when ph_gdr_or_irap_pic_flag is equal to 1 and pps_mixed_nalu_types_in_pic_flag is equal to 1. When ph_gdr_or_irap_pic_flag is equal to 1 and ph_gdr_pic_flag is equal to 0, the picture associated with the PH is an IRAP picture.

In one example, it is proposed to apply the flag pps_mixed_nalu_types_in_pic_flag only to non-IRAP pictures. Specifically, in this method, the semantic of pps_mixed_nalu_types_in_pic_flag should be modified as: pps_mixed_nalu_types_in_pic_flag equal to 1 specifies that each non-IRAP picture referring to the PPS has more than one VCL NAL unit and the VCL NAL units do not have the same value of nal_unit_type. pps_mixed_nalu_types_in_pic_flag equal to 0 specifies that each non-IRAP picture referring to the PPS has one or more VCL NAL units and the VCL NAL units of each picture referring to the PPS have the same value of nal_unit_type.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 6:
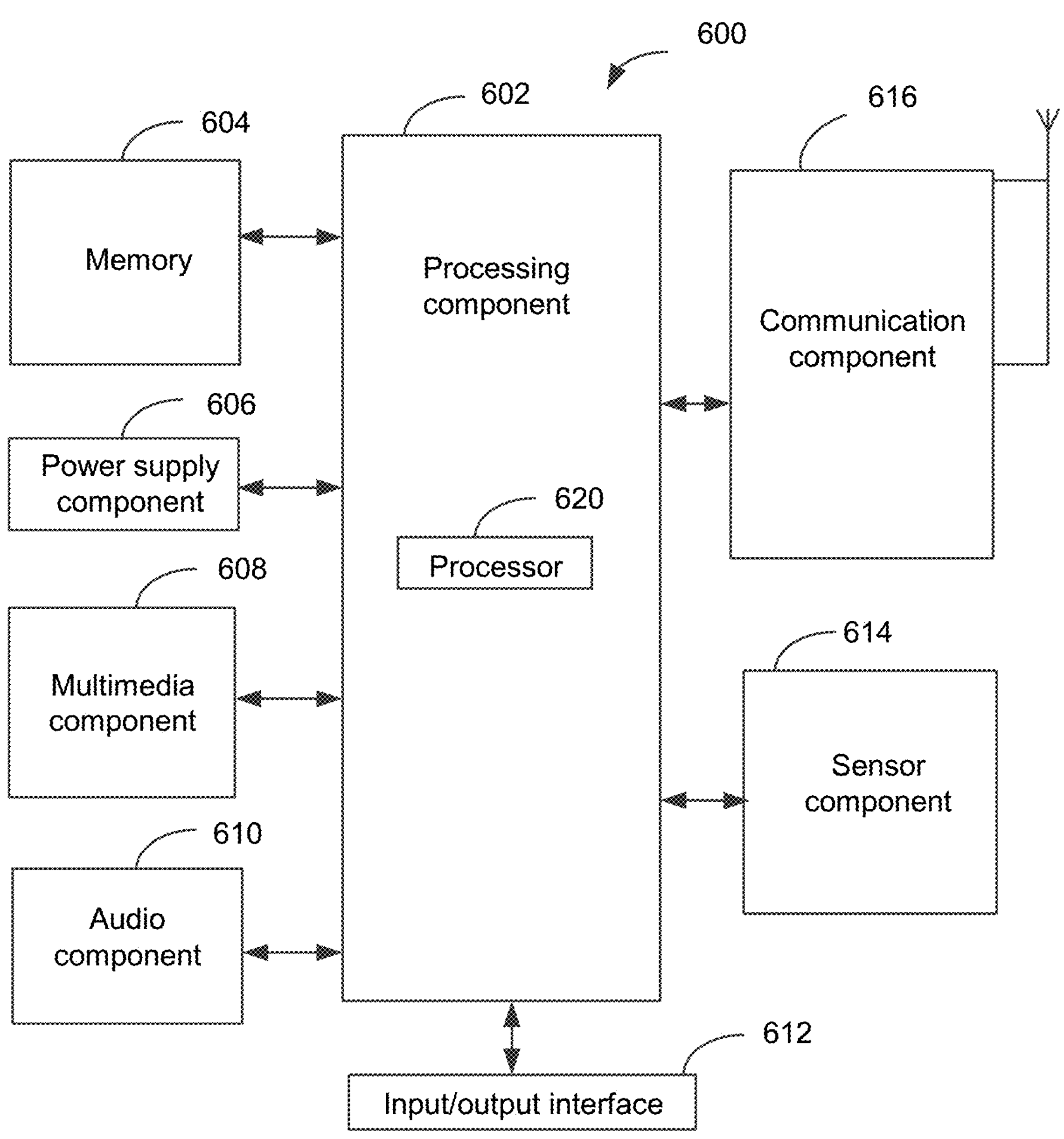
FIG. 6 is a block diagram illustrating an exemplary apparatus for video coding in accordance with some implementations of the present disclosure.

FIG. 6 is a block diagram illustrating an exemplary apparatus for video coding in accordance with some implementations of the present disclosure. The apparatus 600 may be a terminal, such as a mobile phone, a tablet computer, a digital broadcast terminal, a tablet device, or a personal digital assistant.

As shown in FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 usually controls overall operations of the apparatus 600, such as operations relating to display, a telephone call, data communication, a camera operation and a recording operation. The processing component 602 may include one or more processors 620 for executing instructions to complete all or a part of steps of the above method. Further, the processing component 602 may include one or more modules to facilitate interaction between the processing component 602 and other components. For example, the processing component 602 may include a multimedia module to facilitate the interaction between the multimedia component 608 and the processing component 602.

The memory 604 is configured to store different types of data to support operations of the apparatus 600. Examples of such data include instructions, contact data, phonebook data, messages, pictures, videos, and so on for any application or method that operates on the apparatus 600. The memory 604 may be implemented by any type of volatile or non-volatile storage devices or a combination thereof, and the memory 604 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 606 supplies power for different components of the apparatus 600. The power supply component 606 may include a power supply management system, one or more power supplies, and other components associated with generating, managing and distributing power for the apparatus 600.

The multimedia component 608 includes a screen providing an output interface between the apparatus 600 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 608 may include a front camera and/or a rear camera. When the apparatus 600 is in an operation mode, such as a shooting mode or a video mode, the front camera and/or the rear camera may receive external multimedia data.

The audio component 610 is configured to output and/or input an audio signal. For example, the audio component 610 includes a microphone (MIC). When the apparatus 600 is in an operating mode, such as a call mode, a recording mode and a voice recognition mode, the microphone is configured to receive an external audio signal. The received audio signal may be further stored in the memory 604 or sent via the communication component 616. In some examples, the audio component 610 further includes a speaker for outputting an audio signal.

The I/O interface 612 provides an interface between the processing component 602 and a peripheral interface module. The above peripheral interface module may be a keyboard, a click wheel, a button, or the like. These buttons may include but not limited to, a home button, a volume button, a start button and a lock button.

The sensor component 614 includes one or more sensors for providing a state assessment in different aspects for the apparatus 600. For example, the sensor component 614 may detect an on/off state of the apparatus 600 and relative locations of components. For example, the components are a display and a keypad of the apparatus 600. The sensor component 614 may also detect a position change of the apparatus 600 or a component of the apparatus 600, presence or absence of a contact of a user on the apparatus 600, an orientation or acceleration/deceleration of the apparatus 600, and a temperature change of apparatus 600. The sensor component 614 may include a proximity sensor configured to detect presence of a nearby object without any physical touch. The sensor component 614 may further include an optical sensor, such as a CMOS or CCD image sensor used in an imaging application. In some examples, the sensor component 614 may further include an acceleration sensor, a gyroscope sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard, such as WiFi, 4G, or a combination thereof. In an example, the communication component 616 receives a broadcast signal or broadcast related information from an external broadcast management system via a broadcast channel. In an example, the communication component 616 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 600 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 7 is a flowchart illustrating an exemplary process of video coding in accordance with some implementations of the present disclosure.

In step 702, the processor 620 receives a first syntax element in PPS specifying whether a picture referring to, corresponding to, or associated with the PPS comprises one or more NAL units and whether the one or more NAL units have a same NAL unit type.

In step 704, the processor 620 receives a second syntax element in a PH specifying whether the picture referring to, corresponding to, or associated with the PH is an IRAP picture or a GDR picture.

In step 706, the processor 620 determins a value of the first syntax element based on a value of the second syntax element.

In some examples, the processor 620 is implemented on a decoder.

In some examples, the first syntax element equal to 1 specifies that each picture referring to, corresponding to, or associated with the PPS comprises more than one VCL NAL unit and the more than one VCL NAL unit do not have a same NAL unit type, and the first syntax element equal to 0 specifies that each picture referring to, corresponding to, or associated with the PPS comprises one or more VCL NAL units and the one or more VCL NAL units have a same NAL unit type.

In some examples, the second syntax element equal to 1 specifies that the picture referring to, corresponding to, or associated with the PH is an IRAP picture or a GDR picture, and the second syntax element equal to 0 specifies that the picture referring to, corresponding to, or associated with the PH is neither an IRAP picture nor a GDR picture.

In some examples, the processor 620 constraining the value of the first syntax element based on the value of the second syntax element by applying a constraint on the first syntax element to require the value of first syntax element to be zero in response to determining that the picture is an IRAP picture or a GDR picture.

FIG. 8 is a flowchart illustrating an exemplary process of video coding in accordance with some implementations of the present disclosure.

In step 802, the processor 620 receives a first syntax element specifying whether a picture comprises one or more NAL units and whether the one or more NAL units have a same NAL unit type.

In step 804, the processor 620 determines a second syntax element in a PH associated with the picture based on the first syntax element.

In some examples, the processor 620 is implemented on a decoder.

In some examples, the second syntax element specifies whether the picture is a GDR picture or an IRAP picture.

In some examples, the first syntax element is signaled in PPS associated with the picture.

In some examples, the first snytax element may be pps_mixed_nalu_types_in_pic_flag as discussed above.

In some examples, the processor 620 contains the second syntax element in the PH associated with the picture based on the first syntax element by determining that the second syntax element is signaled in the PH in response to determining that the first syntax element equals to 0; determining that the second syntax element is not signaled in the PH and inferring the second syntax element to be 0 in response to determining that the first syntax element equals to 1, where the first syntax element equaling to 1 specifies that each picture referring to, corresponding to, or associated with the PPS comprises more than one NAL units and the more than one NAL unit do not have a same NAL unit type, and where the first syntax element equaling to 0 specifies that each picture referring to, corresponding to, or associated with the PPS comprises one or more NAL units and the one or more NAL units have a same NAL unit type. Further, the second syntax element equaling to 1 specifies that the picture is a GDR picture or an IRAP picture, and the second syntax element equaling to 0 specifies that the picture is neither an IRAP picture nor a GDR picture.

In some examples, the processor 620 contains the second syntax element in the PH associated with the picture based on the first syntax element by receiving both the first syntax element and the second syntax element and applying one constraint to require a value of the received second syntax element be 0 in response to determining that the first syntax element equals to 1. The first syntax element equaling to 1 specifies that each picture referring to, corresponding to, or associated with the PPS comprises more than one NAL unit and the more than one NAL unit do not have a same NAL unit type, and the second syntax element equaling to 0 specifies that the picture is neither an IRAP picture nor a GDR picture. The first syntax element may be pps_mixed_nalu_types_in_pic_flag as discussed above.

In some examples, the first syntax element is signaled in the PH associated with the picture. In some examples, the first syntax element may be ph_mixed_nalu_types_in_pic_flag as discussed above.

In some examples, the processor 620 contains the second syntax element in the PH based on the first syntax element by determining that the second syntax element is signaled in the PH in response to determining that the first syntax element equals to 0 and determining that the second syntax element is not signaled in the PH and inferring the second syntax element to be 0 in response to determining that the first syntax element equals to 1. The first syntax element equaling to 1 specifies that each picture referring to, corresponding to, or associated with the PH comprises more than one NAL unit and the more than one NAL unit do not have a same NAL unit type, and the first syntax element equaling to 0 specifies that each picture referring to, corresponding to, or associated with the PH comprises one or more NAL units and the one or more NAL units have a same NAL unit type. The second syntax element equaling to 1 specifies that the picture is a GDR picture or an IRAP picture, and the second syntax element equaling to 0 specifies that the picture is neither an IRAP picture nor a GDR picture. In some examples, the second syntax element may be ph_gdr_or_rap_pic_flag as discussed above.

In some examples, the processor 620 contains the second syntax element in the PH based on the first syntax element by receiving both the first syntax element and the second syntax element and applying one constraint to require a value of the received second syntax element to be 0 in response to determining that the first syntax element equals to 1. The first syntax element equaling to 1 specifies that each picture referring to, corresponding to, or associated with the PH comprises more than one NAL unit and the more than one NAL unit do not have a same NAL unit type, and the second syntax element equaling to 0 specifies that the picture is neither a GDR picture nor an IRAP picture.

In some examples, the second syntax element specifies whether the picture is a GDR picture, and the first syntax element is signaled in PPS associated with the picture. Further, the processor 620 contains the second syntax element signaled in the PH associated with the picture based on the first syntax element by determining that the second syntax element is signaled in the PH in response to determining that the first syntax element equals to 0 and determining that the second syntax element is not signaled in the PH and inferring a value of the second syntax element to be 0 in response to determining that the first syntax element equals to 1. The first syntax element equaling to 1 specifies that each picture referring to, corresponding to, or associated with the PPS comprises more than one NAL unit and the more than one NAL unit do not have a same NAL unit type, and the first syntax element equaling to 0 specifies that each picture referring to, corresponding to, or associated with the PPS comprises one or more NAL units and the one or more NAL units have a same NAL unit type. The second syntax element equaling to 0 specifies that the picture associated with the PH is neither an IRAP picture nor a GDR picture.

In some examples, the processor 620 further determines a value of the first syntax element in response to determining that the second syntax element is not signaled in the PH, infers the value of the second syntax element to be 0 in response to determining that the value of the first syntax element is 0, and infers the value of the second syntax element to be a value of a third syntax element signaled in the PH in response to determining that the value of the first syntax element is 1. The third syntax element specifies whether the picture is a GDR picture or an IRAP picture.

In some examples, the processor 620 further determines a value of the second syntax element in the PH according to a value of an enable flag signaled in the PPS. The enable flag is to specify whether the picture is enabled to be a GDR picture. Moreover, the processor 620 determines the value of the second syntax element to be 0 in response to determining that the value of the enable flag equals to 0. In some examples, the enable flag may be sps_gdr_enabled_flag as discussed above.

In some examples, the second syntax element specifies whether the picture is a GDR picture, and the first syntax element is signaled in PPS associated with the picture. Further, the processor 620 constrains the second syntax element signaled in the PH associated with the picture based on the first syntax element by constraining the second syntax element signaled in the PH associated with the picture based on the first syntax element and a third syntax element signaled in the PH. The third syntax element specifies whether the picture is a GDR picture or an IRAP picture. In some examples, the third syntax element may be ph_gdr_or_irap_pic_flag as discussed above.

In some examples, the processor 620 further determines the second syntax element to be 1 in response to determining that the third syntax element equals to 1 and the first syntax element equals to 0. The first syntax element equaling to 0 specifies that each picture referring to, corresponding to, or associated with the PPS comprises one or more NAL units and the one or more NAL units have a same NAL unit type. The second syntax element equaling to 1 specifies that the picture associated with the PH is a GDR picture, and the third syntax element equaling to 1 specifies that the picture is a GDR picture or an IRAP picture.

FIG. 9 is a flowchart illustrating an exemplary process of video coding in accordance with some implementations of the present disclosure. In step 902, the processor 620 receives a syntax element. The syntax element may be pps_mixed_nalu_types_in_pic_flag signaled in a PPS associated with the picture as discussed above. In step 904, the processor 620 performs a decoding process based on a value of the syntax element.

In some examples, the value of the syntax element for a GDR picture is equal to 0, when the syntax element is equal to 0 for a picture, and any slice of the picture has nal_unit_type equal to GDR_NUT, all other slices of the picture have the same value of nal_unit_type, and the picture is known to be a GDR picture after receiving a first slice of the picture.

In some examples, the processor 620 may determine that all other slices in the picture comprise a same NAL unit type and the picture is a GDR picture after receiving a first slice in the picture in response to determining that the value of the syntax element equals to 0 and a slice in the picture comprises a NAL unit type equal to GDR_NUT.

In some examples, the processor 620 is implemented on a decoder.

FIG. 10 is a flowchart illustrating an exemplary process of video coding in accordance with some implementations of the present disclosure. In step 1002, the processor 620 receives a first syntax element in a PPS specifying whether a picture corresponding to the PPS comprises one or more NAL units and whether the one or more NAL units have a same NAL unit type.

In step 1004, the processor 620 receives a second syntax element in a PH specifying whether the picture corresponding to the PH is an IRAP picture or a GDR picture.

In step 1006, the processor 620 determines a value of the second syntax element based on a value of the first syntax element.

In some examples, the processor 620 may be implemented on a decoder.

In some examples, the first syntax element equal to 1 specifies that each picture corresponding to the PPS comprises more than one VCL NAL unit and the more than one VCL NAL unit do not have a same NAL unit type, and the first syntax element equal to 0 specifies that each picture corresponding to the PPS comprises one or more VCL NAL units and the one or more VCL NAL units have a same NAL unit type.

In some examples, the second syntax element equal to 1 specifies that the picture corresponding to the PH is an IRAP picture or a GDR picture, and the second syntax element equal to 0 specifies that the picture corresponding to the PH is neither an IRAP picture nor a GDR picture.

In some examples, the processor 620 may apply a first constraint on the NAL type of other slices in the picture to require the NAL type of other slices to be the same as the NAL type of the slice and a second constraint on the second syntax element to require the value of second syntax element to be one.

In some examples, there is provided a non-transitory computer-readable storage medium for video coding. The non-transitory computer-readable storage medium stores computer-executable instructions that, when executed by one or more computer processors 620, cause the one or more computer processors 620 to perform the method illustrated in FIG. 7.

In some examples, there is provided a non-transitory computer-readable storage medium for video coding. The non-transitory computer-readable storage medium stores computer-executable instructions that, when executed by one or more computer processors 620, cause the one or more computer processors 620 to perform the method illustrated in FIG. 8.

In some examples, there is provided a non-transitory computer-readable storage medium for video coding. The non-transitory computer-readable storage medium stores computer-executable instructions that, when executed by one or more computer processors 620, cause the one or more computer processors 620 to perform the method illustrated in FIG. 9.

In some examples, there is provided a non-transitory computer-readable storage medium for video coding. The non-transitory computer-readable storage medium stores computer-executable instructions that, when executed by one or more computer processors 620, cause the one or more computer processors 620 to perform the method illustrated in FIG. 10.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video coding, comprising:

setting, by an encoder, a first syntax element in a picture parameter set (PPS) specifying whether a picture corresponding to the PPS comprises more than one network abstraction layer (NAL) units and whether the more than one NAL units have a same NAL unit type;

setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax element being 1; and forming, by the encoder, a bitstream with the first syntax element and the second syntax element.

2. The method of claim 1, wherein the value of the first syntax element being equal to 1 specifies that each picture corresponding to the PPS comprises more than one video coding layer (VCL) NAL units and the more than one VCL NAL units do not have a same NAL unit type, and the value of the first syntax element being equal to 0 specifies that each picture corresponding to the PPS comprises more than one VCL NAL units and the more than one VCL NAL units have a same NAL unit type; and wherein the value of the second syntax element being equal to 1 specifies that the picture corresponding to the PH is an IRAP picture or a GDR picture, and the value of the second syntax element being equal to 0 specifies that the picture corresponding to the PH is not a GDR picture.

3. The method of claim 1, wherein the value of the first syntax element is set to be 0 based on the value of the second syntax element specifying that the picture is an IRAP picture or a GDR picture.

4. The method of claim 1, wherein the value of the first syntax element is set to be 1 based on that the picture is neither an IRAP picture nor a GDR picture.

5. An apparatus for video coding, comprising:

one or more processors; and a memory configured to store instructions executable by the one or more processors; wherein the one or more processors, upon execution of the instructions, are configured to perform a method comprising following steps:

setting, by an encoder, a first syntax element in a picture parameter set (PPS) specifying whether a picture corresponding to the PPS comprises more than one network abstraction layer (NAL) units and whether the more than one NAL units have a same NAL unit type;

setting, by the encoder, a second syntax element in a picture header (PH) specifying whether the picture corresponding to the PH is an intra random access point (IRAP) picture or a gradual decoding refresh (GDR) picture, wherein a value of the first syntax element is set based on a value of the second syntax element being 1; and forming, by the encoder, a bitstream with the first syntax element and the second syntax element.

6. The apparatus of claim 5, wherein the value of the first syntax element being equal to 1 specifies that each picture corresponding to the PPS comprises more than one video coding layer (VCL) NAL units and the more than one VCL NAL units do not have a same NAL unit type, and the value of the first syntax element being equal to 0 specifies that each picture corresponding to the PPS comprises more than one VCL NAL units and the more than one VCL NAL units have a same NAL unit type; and wherein the value of the second syntax element being equal to 1 specifies that the picture corresponding to the PH is an IRAP picture or a GDR picture, and the value of the second syntax element being equal to 0 specifies that the picture corresponding to the PH is not a GDR picture.

7. The apparatus of claim 5, wherein the value of the first syntax element is set to be 0 based on the value of the second syntax element specifying that the picture is an IRAP picture or a GDR picture.

8. The apparatus of claim 5, wherein the value of the first syntax element is set to be 1 based on that the picture is neither an IRAP picture nor a GDR picture.

9. A method for storing a bitstream, comprising:

performing the method according to claim 1 to generate a bitstream; and storing the bitstream.

10. The method of claim 9, wherein the value of the first syntax element being equal to 1 specifies that each picture corresponding to the PPS comprises more than one video coding layer (VCL) NAL units and the more than one VCL NAL units do not have a same NAL unit type, and the value of the first syntax element being equal to 0 specifies that each picture corresponding to the PPS comprises more than one VCL NAL units and the more than one VCL NAL units have a same NAL unit type; and wherein the value of the second syntax element being equal to 1 specifies that the picture corresponding to the PH is an IRAP picture or a GDR picture, and the value of the second syntax element being equal to 0 specifies that the picture corresponding to the PH is not a GDR picture.

11. The method of claim 9, wherein the value of the first syntax element is set to be 0 based on the value of the second syntax element specifying that the picture is an IRAP picture or a GDR picture.

12. The method of claim 9, wherein the value of the first syntax element is set to be 1 based on that the picture is neither an IRAP picture nor a GDR picture.

* * * * *